US012331547B2

(12) United States Patent
Lunday

(10) Patent No.: US 12,331,547 B2
(45) Date of Patent: Jun. 17, 2025

(54) INDICATOR LEVER

(71) Applicant: Schlage Lock Company LLC, Carmel, IN (US)

(72) Inventor: Drake Lunday, Colorado Springs, CO (US)

(73) Assignee: Schlage Lock Company LLC, Carmel, IN (US)

( * ) Notice: Subject to any disclaimer, the term of this patent is extended or adjusted under 35 U.S.C. 154(b) by 159 days.

(21) Appl. No.: 18/092,515

(22) Filed: Jan. 3, 2023

(65) Prior Publication Data

US 2023/0151639 A1 May 18, 2023

Related U.S. Application Data

(63) Continuation of application No. 16/792,678, filed on Feb. 17, 2020, now Pat. No. 11,542,725, which is a continuation of application No. 15/957,554, filed on Apr. 19, 2018, now Pat. No. 10,563,425.

(51) Int. Cl.
*E05B 41/00* (2006.01)
*E05B 1/00* (2006.01)

(52) U.S. Cl.
CPC .............. *E05B 41/00* (2013.01); *E05B 1/003* (2013.01); *E05B 1/0084* (2013.01); *E05Y 2900/132* (2013.01)

(58) Field of Classification Search
CPC ............................... E05B 41/00; E05B 1/0084
USPC ............................................................ 70/432
See application file for complete search history.

(56) References Cited

U.S. PATENT DOCUMENTS 417,326 A * 12/1889 King ........................ E05B 41/00 40/907
419,607 A * 1/1890 King ........................ E05B 41/00 40/907
590,418 A * 9/1897 Langford ................ E05B 41/00 40/907

(Continued)

FOREIGN PATENT DOCUMENTS

DE 10339601 A1 * 3/2005 ............... E05B 1/00
FR 1481665 A * 5/1967

(Continued)

OTHER PUBLICATIONS

International Search Report; International Searching Authority; International Application No. PCT/US2019/028307; Jul. 23, 2019; 2 pages.

(Continued)

*Primary Examiner* — Carlos Lugo
(74) *Attorney, Agent, or Firm* — Taft Stettinius & Hollister LLP

(57) ABSTRACT

A lock apparatus according to certain embodiments has a first state and a second state, and generally includes a handle and a status indicator. The handle includes a display area formed in a front face of the handle, and the display area comprises at least a majority of the front face. The status indicator is configured to display each of a plurality of indicia in the display area. The status indicator is configured to display a first indicium in the display area when the lock apparatus is in the first state, and is configured to display a second indicium in the display area when the lock apparatus is in the second state.

17 Claims, 19 Drawing Sheets

(56) References Cited

U.S. PATENT DOCUMENTS

| | | | | | |
|---|---|---|---|---|---|
| 1,841,570 | A * | 1/1932 | Burkholder | E05B 17/10 362/100 |
| 1,898,127 | A | 2/1933 | Hershey | |
| 2,793,522 | A * | 5/1957 | Tornoe | E05B 41/00 70/438 |
| 2,989,859 | A * | 6/1961 | Eads | E05B 63/0013 292/5 |
| 3,046,776 | A * | 7/1962 | Marotto | E05B 65/0858 D8/341 |
| 3,304,756 | A | 2/1967 | Eads | |
| 3,824,819 | A * | 7/1974 | Neary | E05B 41/00 70/438 |
| 3,869,901 | A * | 3/1975 | Neary | E05B 41/00 70/432 |
| 4,559,796 | A | 12/1985 | De Forrest, Sr. | |
| 4,760,380 | A | 7/1988 | Quenneville et al. | |
| 5,111,007 | A * | 5/1992 | Miller | H01H 27/06 340/815.45 |
| 5,369,969 | A * | 12/1994 | Sassella | E05B 9/08 70/432 |
| 6,619,824 | B1 * | 9/2003 | Hou | B60Q 1/2615 362/546 |
| 7,248,163 | B2 | 7/2007 | Wu | |
| 7,370,497 | B2 | 5/2008 | Yu | |
| 7,852,621 | B2 | 12/2010 | Lin et al. | |
| 8,469,411 | B2 | 6/2013 | Costigan | |
| 8,939,477 | B2 | 1/2015 | Welsby et al. | |
| 9,879,445 | B2 * | 1/2018 | Gopalakrishnan | E05B 27/0003 |
| 9,911,254 | B2 * | 3/2018 | Ng | G07C 9/00 |
| 10,494,836 | B2 * | 12/2019 | Voelker | E05B 39/00 |
| 10,563,425 | B2 | 2/2020 | Lunday | |
| 10,745,942 | B2 * | 8/2020 | Lehner, Jr. | E05B 65/1093 |
| 2004/0187533 | A1 | 9/2004 | Huang | |
| 2004/0237255 | A1 * | 12/2004 | Lin | E05B 1/0069 16/904 |
| 2005/0023841 | A1 | 2/2005 | Chen | |
| 2006/0049645 | A1 | 3/2006 | Drumm | |
| 2009/0139052 | A1 | 6/2009 | Boenisch | |
| 2009/0284358 | A1 | 9/2009 | Ieda et al. | |
| 2011/0016938 | A1 | 1/2011 | Chi | |
| 2012/0279264 | A1 | 11/2012 | Yu | |
| 2014/0306463 | A1 | 10/2014 | Ho | |
| 2014/0353980 | A1 | 12/2014 | Beck | |
| 2015/0225982 | A1 | 8/2015 | Bronner | |
| 2015/0315816 | A1 | 11/2015 | Gopalakrishnan et al. | |
| 2018/0266145 | A1 | 9/2018 | Chou | |
| 2020/0109578 | A1 | 4/2020 | Lunday et al. | |

FOREIGN PATENT DOCUMENTS

| | | | | | |
|---|---|---|---|---|---|
| GB | 191401823 | A * | 1/1915 | |
| GB | 2429747 | A * | 3/2007 | B60Q 1/2669 |
| GB | 2474112 | B | 7/2014 | |
| KR | 880002676 | Y1 * | 7/1988 | |

OTHER PUBLICATIONS

Written Opinion of the International Searching Authority; International Application No. PCT/US2019/028307; Jul. 23, 2019; 5 pages.

Canadian Examination Report; Canadian Intellectual Property Office; Canadian Patent Application No. 3,048,575; Jul. 16, 2020; 3 pages.

Canadian Examination Report; Canadian Intellectual Property Office; Canadian Patent Application No. 3,048,575; Nov. 1, 2021; 3 pages.

* cited by examiner

INDICATOR LEVER

CROSS REFERENCE TO RELATED APPLICATIONS

The present application is a continuation of U.S. patent application Ser. No. 16/792,678 filed Feb. 17, 2020 and issued as U.S. Pat. No. 11,542,725, which is a continuation of U.S. patent application Ser. No. 15/957,554 filed Apr. 19, 2018 and issued as U.S. Pat. No. 10,563,425, the contents of each application are incorporated herein by reference in their entirety.

BACKGROUND

Embodiments of the present application generally relate to locks and levers for entryway devices. More particularly, but not exclusively, embodiments of the present application relate to lock assemblies having adjustable status indicators.

Certain types of entryway devices and/or locksets can include a status indicator that can provide visual information regarding a status of the lockset and/or a room or passageway associated with the entryway device and/or lockset. The type of status information communicated by such status indicators can vary. For example, the status indicator can provide information indicating whether a door and/or the associated lockset is locked or unlocked, and/or whether a room or area associated with that door and/or lockset is occupied or unoccupied, among other types of information.

With respect to at least certain types of mechanical status indicators, the status indicator can often be mechanically coupled to the associated latch bolt, such as, for example, via a direct drive mechanism. However, use of such direct drive mechanisms, among other forms of mechanical coupling, can result in such locksets being susceptible at least to unauthorized unlocking via illicit physical manipulation of the status indicator. For example, if an individual were to forcibly move or otherwise displace a status indicator from displaying an indicator associated with a locked status to an unlocked status, such movement or displacement of the status indicator can be translated, via the mechanical coupling of the direct drive mechanism, to a bolt or latch of the lockset such that the bolt or latch can be moved from a locked position to an unlocked position. Further, the components associated with mechanical coupling of a status indicator to the lockset, such as the components of a direct drive mechanism, can contribute to an increase in the bulk, size, cost, and/or complexity of the lockset.

BRIEF SUMMARY

An aspect of an embodiment of the present application is an apparatus comprising a lever and an activation carrier that can be displaced within the lever between an activated position and an inactivated position. The apparatus can further include a first magnet that is coupled to the activation carrier and an indicator barrel that is rotatable about the lever from a first position to a second position. Further, when in the first position, at least a portion of a first side of the indicator barrel can be viewable through at least an opening in an external surface of the lever. Additionally, when in the second position, at least a portion of a second side of the indicator barrel can be viewable through the opening in the external surface. The apparatus can also include a second magnet that is coupled to the indicator barrel. Further, the displacement of the activation carrier from the inactivated position to the activated position can bring the first magnet within a distance of the second magnet that facilitates, via a magnetic force between the first magnet and the second magnet, the rotation of the indicator barrel from the first position to the second position.

Another aspect of an embodiment of the present application is an apparatus that includes a lever and an activation carrier having a first end, a second end, and an outer wall, the outer wall including a helical groove. Additionally, the first end of the activation carrier can be coupled to a first magnet. The apparatus can also include an actuator having an activation pin, the activation pin positioned to abut the second end of the activation carrier to transmit a pushing force to the activation carrier to displace the activation carrier at least in a first linear direction to an activation position in the lever as the actuator is displaced in the first linear direction. The apparatus can also include a stationary pin that can extend into at least a portion of the helical groove and which can be structured to engage the helical groove to facilitate rotation of the activation carrier at least as the activation carrier is displaced in the first linear direction. The apparatus can also include an indicator barrel that can be rotatably coupled to the lever and connected to a second magnet. The indicator barrel can be rotatable from a first position to a second position by a magnetic force between the first magnet and the second magnet when the first magnet is displaced to the activated position.

Additionally, an aspect of an embodiment of the present application is an apparatus that includes an activation carrier having an outer wall that includes a helical groove, and a first magnet that is connected to the activation carrier, and which can have a first pole and a second pole, the first pole having a different polarity than the second pole. The apparatus can further include a stationary pin that can extend into at least a portion of the helical groove. The stationary pin can be structured to engage the helical groove to facilitate rotation of the activation carrier as the activation carrier is linearly displaced to an activation position. Additionally, the apparatus can include a second magnet having a first pole and a second pole, a polarity of the first pole of the second magnet being the same as the polarity of the first pole of the first magnet, and a polarity of the second pole of the second magnet being the same as the polarity of the second pole of the first magnet. An indicator barrel can be connected to the second magnet and can be rotatable from a first position to a second position by a repelling magnetic force generated between the first and second magnets as the first magnet is displaced to the activation position. The first magnet can be oriented relative to the activation carrier for the first pole of the first magnet to be rotatably displaced into closer proximity than the second pole of the first magnet to the second magnet when activation carrier is displaced to the activation position. Further, the second magnet can be oriented relative to the indicator barrel so that, when the indicator barrel is in the first position, at least a portion of the first pole of the second magnet is in closer proximity than the second pole of the second magnet to the first magnet.

BRIEF DESCRIPTION OF THE DRAWINGS

The description herein makes reference to the accompanying figures wherein like reference numerals refer to like parts throughout the several views.

Figure 1:
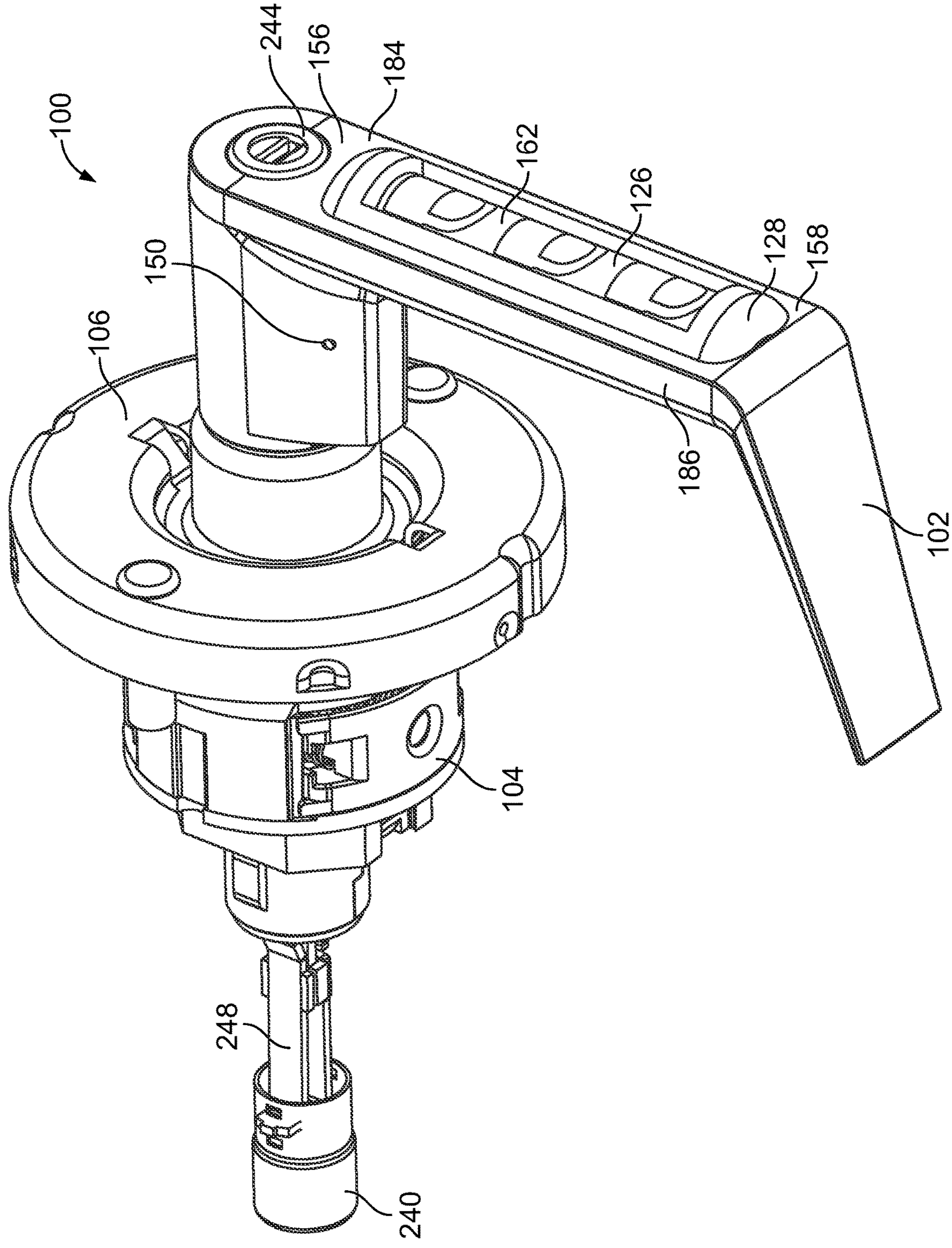
FIG. 1 illustrates a perspective side view of a portion of an exemplary lock assembly according to an illustrated embodiment of the present application.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates a perspective side view of a portion of an exemplary lock assembly 100 according to an illustrated embodiment of the present application. The lock assembly 100 is structured to be operably mounted or coupled to an entryway device, such as, for example, a door or gate, among other devices. As shown in FIG. 1, the lock assembly 100 includes a first lever 102 that is coupled to a lock chassis 104, such as, for example, via a first spring cage 106 that is coupled to both the lever 102 and the lock chassis 104.

While FIG. 1 depicts a particular type of lock assembly 100, embodiments of the present application are adaptable to a variety of different types and designs of lock assemblies and lock chassis. The lock chassis 104 can be configured to translate rotational movement provide by rotational displacement of the first lever 102 to linear displacement that can facilitate the slideable movement of a latch bolt between extended and retracted positions. The first lever 102 can be operably coupled to the lock chassis 104, such as, for example, attached to a first spring cage spindle 108 of the first spring cage 106 that is connected to a first chassis spindle. As discussed below, the first lever 102 can be configured to house at least a portion of an indicator assembly 110 that can be configured to communicate status information, including, for example, status information pertaining to the lock assembly 100 being in an locked or unlocked state, or a state or condition relating to the entryway device and/or an associated space, such as, for example, whether a room associated with the entryway device and lock assembly 100 is occupied or unoccupied, among other information or indications.

Figure 2:
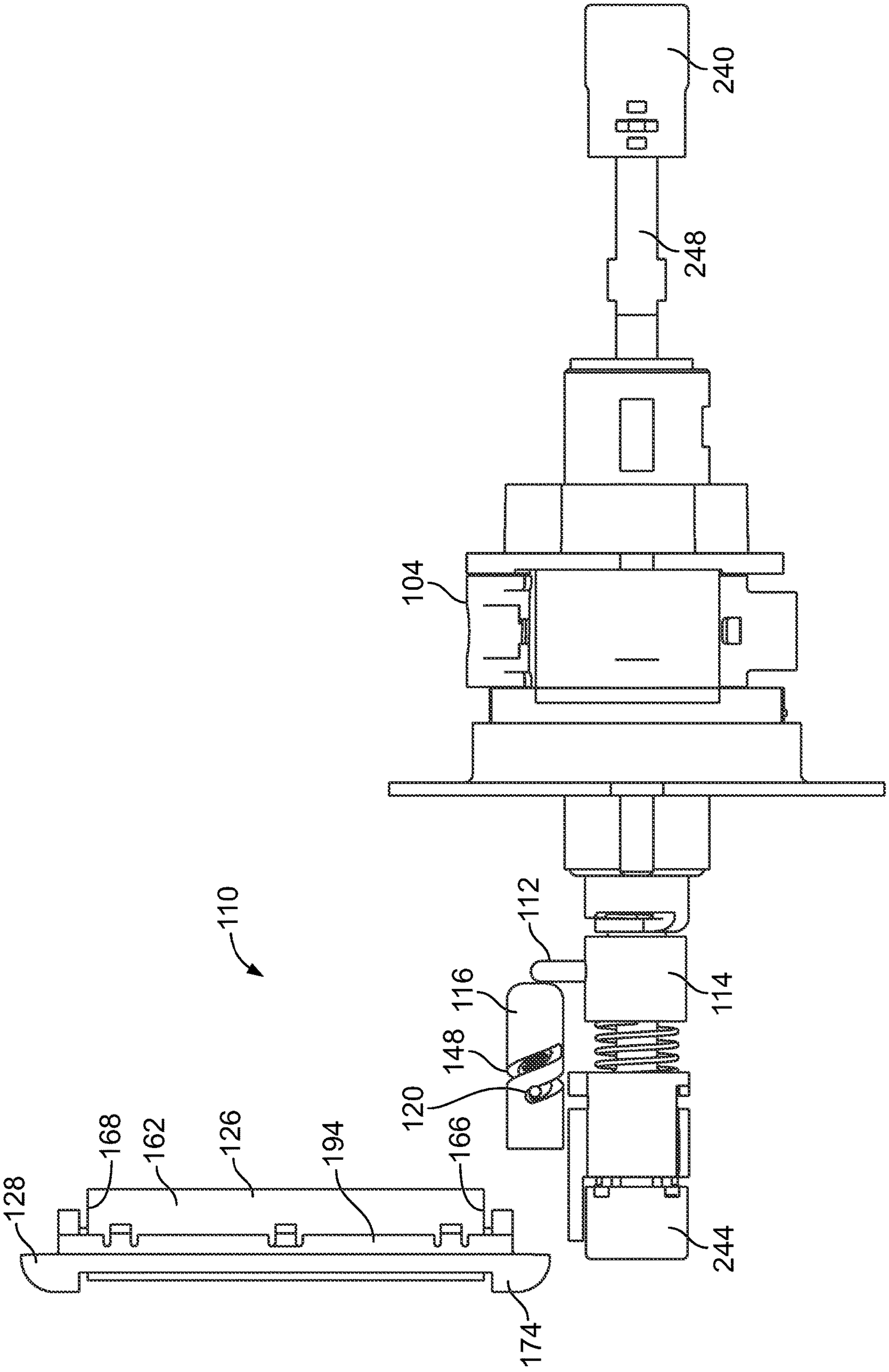
FIG. 2 illustrates an exploded side view of a portion of an exemplary lock assembly according to an illustrated embodiment of the present application.
Figure 3:
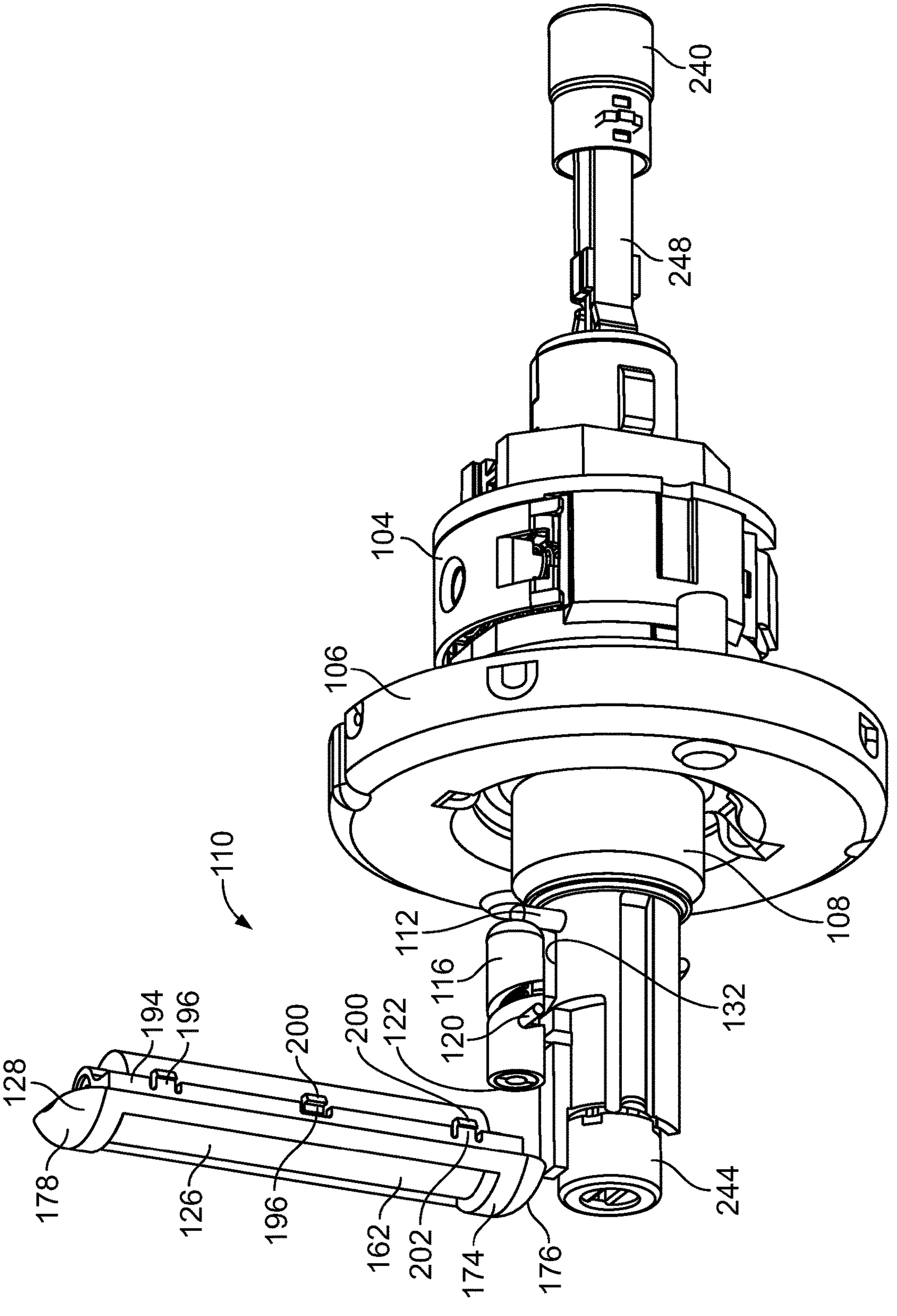
FIG. 3 illustrates a side perspective view of a portion of an exemplary lock assembly according to an illustrated embodiment of the present application.

FIGS. 2 and 3 illustrate a side view and a side perspective view, respectively, of a portion of the lock assembly 100 shown in FIG. 1. For at least purposes of discussion, the first lever 102 and the first spring cage 106 shown in FIG. 1 have been hidden from view in FIG. 2, and the first lever 102 has been hidden from view in FIG. 3. However, the components of the indicator assembly 110 are generally arrange as if the first lever 102 were present in FIGS. 2 and 3. Further, a rear side perspective view of an exemplary first lever 102 is shown in FIG. 5. As shown in at least FIGS. 2-4, according to the illustrated embodiment, the indicator assembly 110 can include the first lever 102, an activation pin 112, an actuator 114, an activation carrier 116, a biasing element 118, a stationary pin 120, a first magnet 122, a second magnet 124, an indicator barrel 126, and an indicator bezel 128. As shown by at least FIG. 3, the activation pin 112 can be attached to, or part of the actuator 114, which can be coupled to a thumb or push button assembly. For example, according to the illustrated embodiment, the activation pin 112 can be securely received within an aperture 130 in the actuator 114, among other manners of securely attaching the activation pin 112 to the actuator 114. Further, the actuator 114 can be sized for slideable linear displacement within at least a portion of the first spring cage spindle 108. As discussed below, a push button of the thumb or push button assembly of the lock assembly 100 can be configured to be accessible by a user or operator on at least a side of the entryway device that is opposite to the side of the entryway device at which the first lever 102 is positioned. Activation of the thumb turn or push button assembly by a user can facilitate generally linear displacement of the actuator 114 in a first direction generally toward the first lever 102. Such linear displacement of the actuator 114 can thus result in similar linear displacement of the activation pin 112 in the first direction from an inactivated position to an activated position. As shown in at least FIGS. 3 and 6, the first spring cage spindle 108 of the first spring cage 106 can have a generally elongated slot 132 that is configured to accommodate such linear displacement of the activation pin 112 between the inactivated and activated positions.

Figure 5:
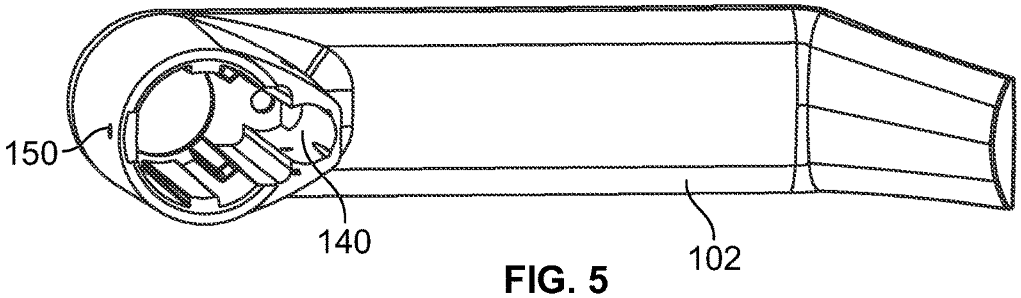
FIG. 5 illustrates a rear side perspective view of an exemplary first lever according to an illustrated embodiment of the subject application.
Figure 6:
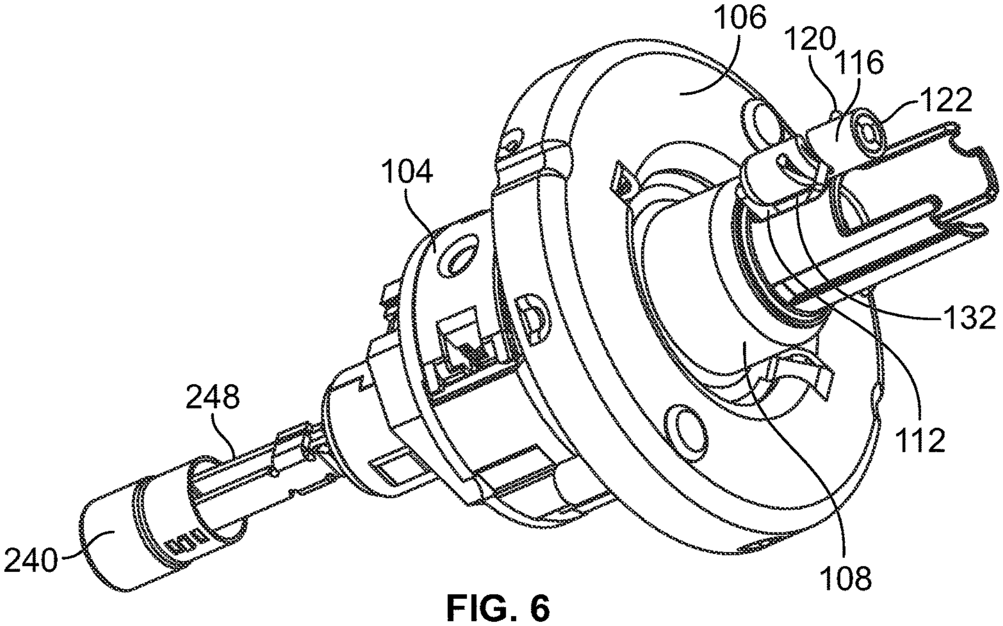
FIG. 6 illustrates a perspective side view of a portion of an activation pin that is extending through a spring cage spindle, and which is engaging an activation carrier of an exemplary indicator assembly according an illustrated embodiment of the subject application.
Figure 7:
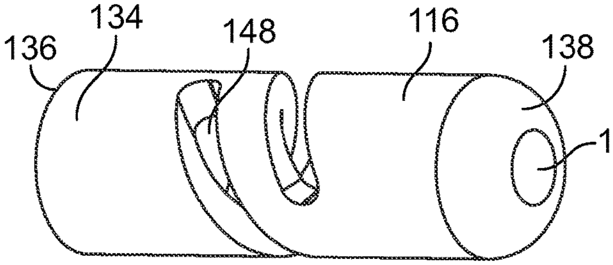
FIG. 7 illustrates a rear side perspective view of an exemplary activation carrier according to an illustrated embodiment of the subject application.
Figure 8:
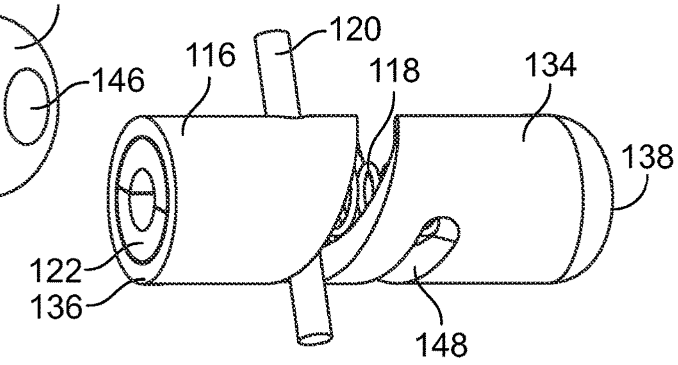
FIG. 8 illustrates a side view of an exemplary activation carrier according to an illustrated embodiment of the subject application that is housing at least a portion of a first magnet and a biasing member, and which is engaged with a stationary pin.

As shown by at least FIGS. 6 and 7, according to the illustrated embodiment, the activation carrier 116 can have a generally cylindrical or tubular shape that is generally defined by an outer wall 134. The outer wall 134 can extend from a first end 136 to a second end 138 of the activation carrier 116. Additionally, the outer wall 134 of the activation carrier 116 can have an outer size, such as, for example, an outer diameter, that can accommodate both slideable linear and rotational displacement of the activation carrier 116 within an activation bore or chamber 140 (FIG. 5) of the first lever 102. The outer wall 134 can also generally define an inner cavity 142 of the activation carrier 116 that is sized to receive placement of the biasing element 118, as well as at least portions of the stationary pin 120 and the first magnet 122, as discussed below. Thus, according to the illustrated embodiment, the outer wall 134 can generally define an opening 144 at the first end 136 of the activation carrier 116 that provides an inlet for insertion of at least the biasing element 118 and first magnet 122 into the inner cavity 142 of the activation carrier 116.

The second end 138 of the outer wall 134 is configured and positioned to abut the activation pin 112. Moreover, as discussed below, linear displacement of the activation pin 112 at least in the first direction from the inactivated position to the activated position can provide a force for the linear and rotational displacement of the activation carrier 116 from an inactivated to an activated position. Further, according to the illustrated embodiment, the outer wall 134 at the second end 138 of the activation carrier 116 can include a rear wall 146 that can generally enclose the second end 138 of the activation carrier 116.

According to certain embodiments, the outer wall 134 can include a helical groove 148 along at least a portion of the outer wall 134 of the activation carrier 116 that is sized to receive placement of the stationary pin 120, and moreover which can accommodate at least a portion of the helical groove 148 sliding about the stationary pin 120 during displacement of the activation carrier 116. Moreover, according to the illustrated embodiment, the helical groove 148 and stationary pin 120 are sized to facilitate rotational displacement of the activation carrier 116 as the activation carrier 116 is linearly displaced between inactivated and activated positions. Further, according to certain embodiments, the stationary pin 120 is positioned in a pin hole 150 (FIGS. 1 and 4) in the first lever 102, and extends through at least a portion of the activation bore or chamber 140 of the first lever 102. According to the illustrated embodiment, the pin hole 150 can extend through one or more external surfaces of the first lever 102. Further, the stationary pin 120 can be generally orthogonal to both the direction of linear displacement taken by the activation carrier 116 between the inactivated and activated positions of the activation carrier 116, as well as orthogonal to the central longitudinal axis of the activation bore or chamber 140 (FIG. 5) of the first lever 102. Additionally, the stationary pin 120 can also be generally orthogonal to the activation pin 112.

According to the illustrated embodiment, the stationary pin 120 extends through the inner cavity 142 of the activation carrier 116, and thus through opposing sides of the helical groove 148 in outer wall 134 of the activation carrier 116. Accordingly, the biasing element 118, such as, for example, a spring, can be positioned within the inner cavity 142 between the portion of the stationary pin 120 that extends through the inner cavity 142 and the rear wall 146. Thus, as the stationary pin 120 is maintained within the first lever 112 at a generally static position relative to the linear position of the activation carrier 116, when the activation carrier 116 is displaced from inactivated position to the activated position, such as, for example, by displacement of the activation pin 112 in the first direction, the linear distance between the stationary pin 120 and the rear wall 146 in the inner cavity 142 of the activation carrier 116 decreases. Such a decrease in linear distance between the stationary pin 120 and the rear wall 146 can result in an increase in the compression of the biasing element 118 that is positioned therebetween. Accordingly, in the event the force provided by the activation pin 112 is removed, or reduced to a level below that of a biasing force provided by the biasing element 118, the compressed biasing element 118 can provide a force as the biasing element 118 at least partially decompresses that can facilitate the linear displacement, as well as the rotational displacement, of the activation carrier 116 in a second direction that facilitates the return of the activation carrier 116 back to the inactivated position, the second direction being opposite of the first direction. As discussed below, such return of the activation carrier 116 via, at least in part, the biasing force provided by the biasing element 118 can also at least assist in facilitating the return of the activation pin 112 and the associated actuator 114 to their respective inactivated positions.

The first magnet 122 can comprise a diametric magnet having opposing first and second poles. According to the illustrated embodiment, the first magnet 122 is sized to be secured within the inner cavity 142 of the activation carrier 116. For example, according to certain embodiments, the first magnet 122 can have a size and/or shape that is configured to be matingly received in a counter bore 152 (FIG. 4) of the inner cavity 142 of the activation carrier 116. Further, the first magnet 122 can be positioned within the inner cavity 142 such that a portion of the first magnet 122 is positioned adjacent to, or protrudes through, the opening 144 of the inner cavity 142 and/or the first end 136 of the activation carrier 116.

Figure 4:
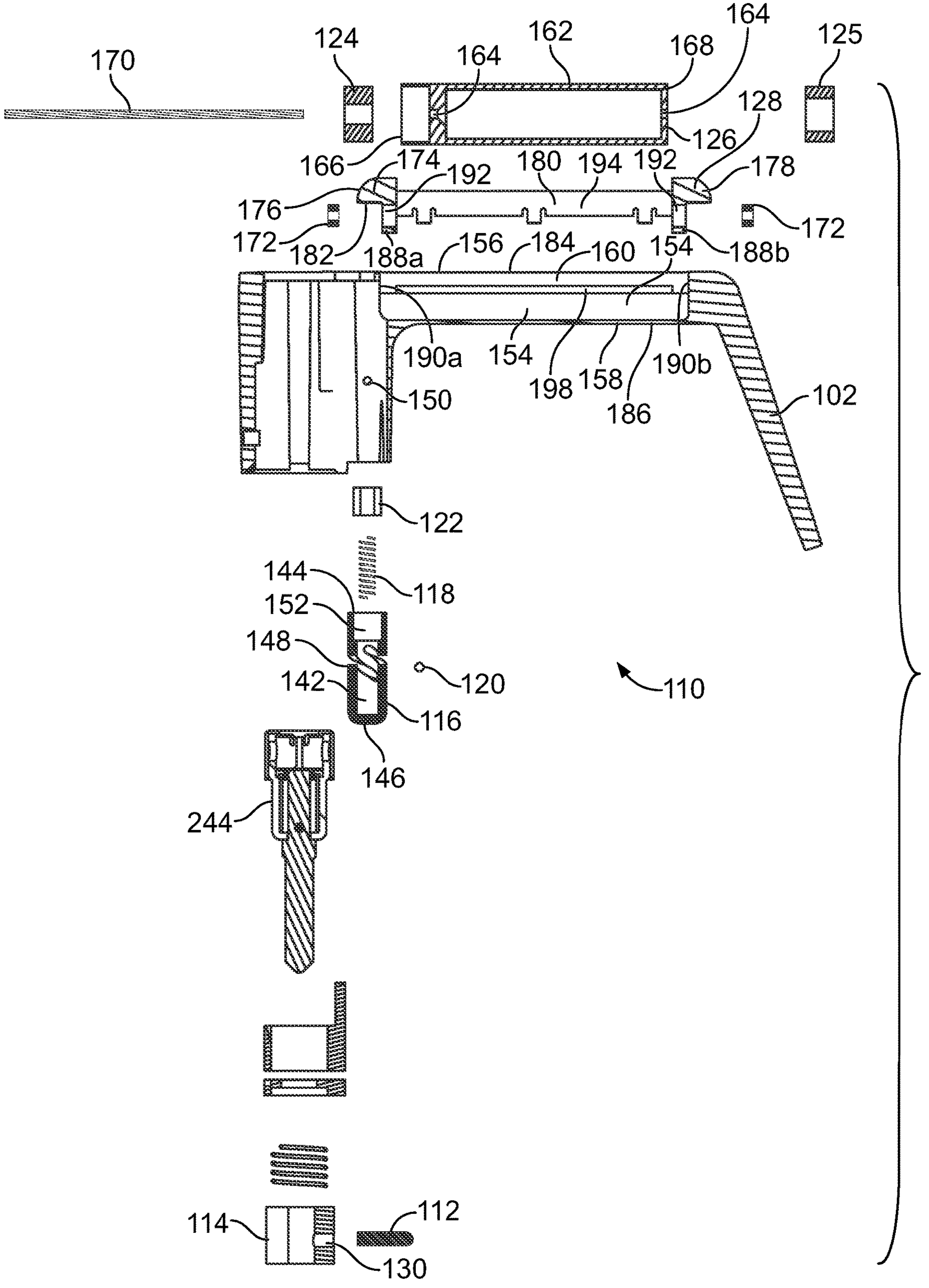
FIG. 4 illustrates an exploded side view of a portion of an exemplary indicator assembly according to an illustrated embodiment of the subject application.
Figure 9:
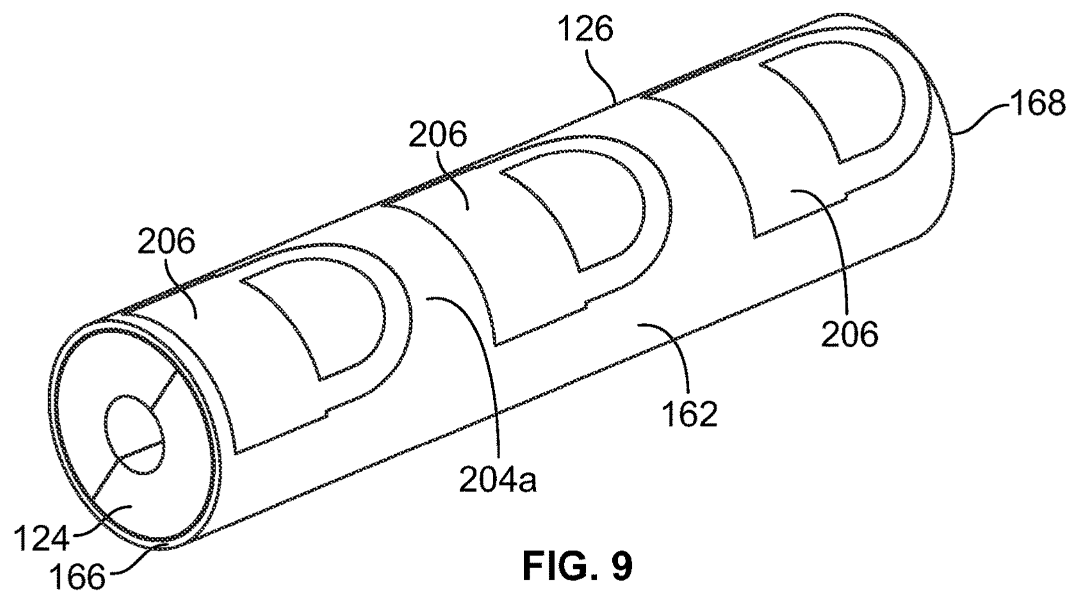
FIG. 9 illustrates a first side perspective view of a first side of an indicator barrel having a plurality of first indicator symbols according to an illustrated embodiment of the subject application.
Figure 10:
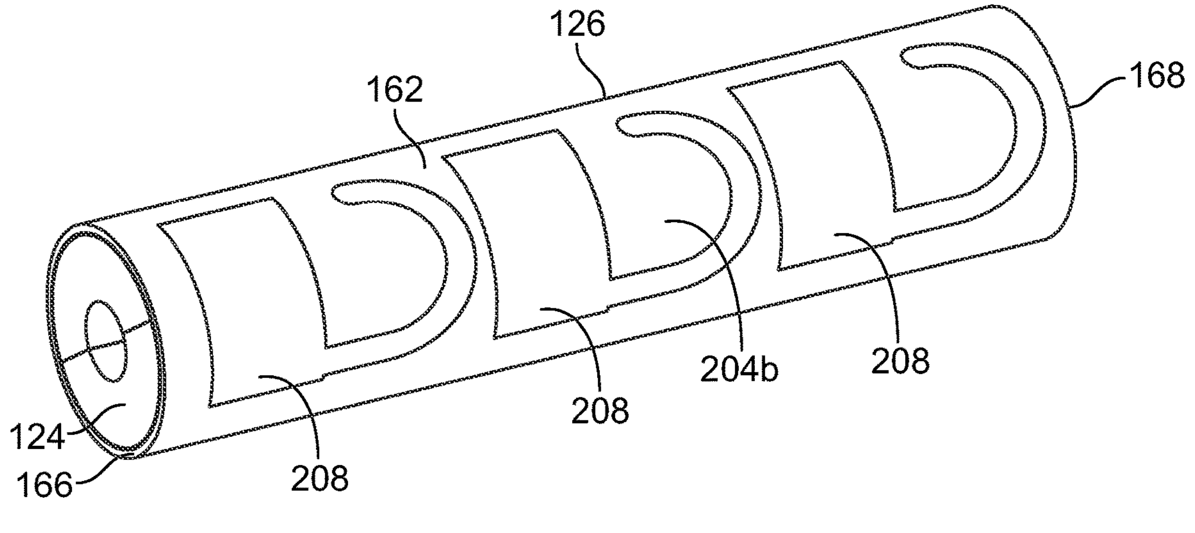
FIG. 10 illustrates a second side perspective view of a second side of an indicator barrel having a plurality of second indicator symbols according to an illustrated embodiment of the subject application.

As shown by at least FIGS. 4, 9, and 10, the indicator barrel 126 has a size, such as, for example, an outside diameter, that is configured to be rotatably displaced within a barrel chamber 154 in the first lever 102. According to the illustrated embodiment, the barrel chamber 154 can extend along a central longitudinal axis that is generally orthogonal to the central longitudinal axis of the activation bore or chamber 140 of the first lever 102. Additionally, the barrel chamber 154 can extend through a face portion 156 of a handle portion 158 of the first lever 102 so as to provide the barrel chamber 154 with an opening 160 in the face portion 156 through which, when the indicator barrel 126 is housed within the first lever 102, a least a portion of the indicator barrel 126 is visible to a user of the lock assembly 100 in a manner in which the user can see one or more indicator symbols that are on the indicator barrel 126, as discussed below.

According to the illustrated embodiment, the indicator barrel 126 can have a sidewall 162 having generally cylindrical configuration. However, the sidewall 162 of the indicator barrel 126 can have a variety of shapes and configurations, including, for example, a circular, oval, non-circular, triangular, and polygonal cross sectional shape, and combinations thereof, among other shapes and configurations. The indicator barrel 126 can also include at least one or more openings 164 that extend between, or are positioned at, opposing first and second ends 166, 168 of the indicator barrel 126. For example, according to the illustrated embodiment, the opening 164 can extend between the first end 166 and second end 168 of the indicator barrel 126 such that a spindle or axle 170 about which the indicator barrel 126 can rotate, or which the indicator barrel 126 can be rotated with, extends though the indicator barrel 126. According to the illustrated embodiment, opposing ends of the spindle 170 can be each coupled to bearings 172 that can at least assist in the rotation of the spindle 170, and thus rotation of the indicator barrel 126. Alternatively, the opening 164 can be sized or configured to receive separate spindles that extend into opposing ends of the opening 164 and/or the indicator barrel 126, but which do not extend through the entire indicator barrel 126.

As shown by at least FIG. 4, according to certain embodiments, the opening 164 at the first end 166 of the indicator barrel 126 can be sized to receive secure placement of the second magnet 124. Similar to the first magnet 122, according to the illustrated embodiment the second magnet 124 is a diametric magnet having opposing first and second poles. As discussed below, the first and second magnets 122, 124 can be arranged such that, as the activation carrier 116 is displaced in the first direction toward the activated position, the attraction or repulsion between one or more of the magnetic poles of the first and second magnets 122, 124 can cause rotation of second magnet 124 such that the indicator barrel 126 also rotates. Additionally, as discussed below, the indicator symbols on the indicator barrel 126 can be arranged such that the indicator barrel 126 is rotated from a position at which one or more first indicator symbols are visible to a user of the lock assembly to a position at which one or more second indicator symbols are visible to the user, the second indicator symbols including at least one indicator that conveys a different indication than the first indicator symbols.

The indicator bezel 128 is configured to be secured to the first lever 102 and positioned about at least a portion of the opening 160 of the barrel chamber 154. According to the illustrated embodiment, the indicator bezel 128 includes a body portion 174 that extends between opposing first and second ends 176, 178 of the indicator bezel 128. The body portion 174 can include an opening 180 through which, when the indicator bezel 128 is at least secured to the first lever 102, can provide at least visual access to indicator symbols on the indicator barrel 126 through the indicator bezel 128. Further, according to the illustrated embodiment, the body portion 174 of the indicator bezel 128 can include a base wall 182, at least a portion of the base wall 182 configured to abut, or be generally adjacent to, the face portion 184 of the handle portion 186 of the first lever 102 when the indicator bezel 128 is secured to the first lever 102. Thus, according to the illustrated embodiment, the base wall 182 can have an outer periphery having a size that is larger than the opening 160 of the barrel chamber 154.

The indicator bezel 128 can further include a first leg **188*a* and the second leg 188*b* that extend downwardly from the base wall 182 of the indicator bezel 128. According to the illustrated embodiment, the first leg 188*a* is inwardly offset from the first end 176 of the indicator bezel 128, while second leg 188*b* is inwardly offset from the second end 178 of the indicator bezel 128 such that the first and second legs 188*a*, 188*b* extend into the barrel chamber 154 when the indicator bezel 128 is secured to the first lever 102. According to certain embodiments, the distance that the first and second legs 188*a*, 188*b* are inwardly offset can be based on the distance between opposing end walls 190*a*, 190*b* of the barrel chamber 154. For example, according to certain embodiments, the first and second legs 188*a*, 188*b* can be inwardly offset from the first end 176 and the second end 178, respectively, of the indicator bezel 128, by a distance that accommodates an outer sidewall of each of the first and second legs 188*a*, 188*b* abutting, or being generally adjacent to, the end walls 190*a*, 190*b* of the barrel chamber 154 when the indicator bezel 128 is positioned within the barrel chamber 154. Additionally, according to the illustrated embodiment, an opening 192 in each of the first and second legs 188***a*, 188*b* can be sized to house a bearing 172 through which the spindle 170 is secured.

The indicator bezel 128 can be secured to the first lever 102 in a number of manners. For example, according to the illustrated embodiment, the indicator bezel 128 includes a skirt 194 that downwardly extends from the base wall 182. Further, according to the illustrated embodiment, the skirt 194 generally extends along the base wall 182 along a portion of the body portion 174 that is generally adjacent, as well as generally parallel, to at least two opposing sides of the opening 180 in the body portion 174 of the indicator bezel 128. Additionally, the skirt 194 can include a plurality of engagement tabs 196. As shown in at least FIG. 3, according to the illustrated embodiment, the engagement tabs 196 can have a generally "L" shaped configuration, with a bottom protrusion 200 outwardly extending from the arm 202 of the engagement tab 196. The protrusions 200 can be sized to be received in an adjacent recess 198 in the first lever 102, such as, for example, a recess 198 formed by an undercut in the barrel chamber 154. According to such an embodiment, when the indicator bezel 128 is inserted into the barrel chamber 154, the protrusions 200 of the engagement tabs 196 can abut, or other otherwise contact, adjacent walls of the barrel chamber 154 in a manner that inwardly deforms or deflects the arms 202 of the engagement tabs 196. When the indicator bezel 128 is inserted into the barrel chamber 154 to a depth at which the indicator bezel 128 is to be connected to the first lever 102, the protrusions 200 of the engagement tabs 196 can be generally aligned with the mating recess(es) 198, such as the undercut, that can receive insertion of at least a portion of the protrusions 200. With the protrusions 200 generally aligned with the mating recess(es) 198, the arms 202 of the engagement tabs 196 can at least partially return from their inwardly deformed or deflected positions so that at least a portion of the protrusions 200 are received in the mating recess(es) 198, thereby securing the indicator bezel 128 to the first lever 102. Further, such attaching of the indicator bezel 128 can occur after the indicator barrel 126 has been rotatably secured about the spindle 170 in the barrel chamber 154. Thus, when the indicator bezel 128 is secured to the first lever 102, at least a portion of the indicator barrel 126 can be viewed through the opening 180 in the indicator bezel 128.

FIGS. 9 and 10 illustrate views of opposing first and second sides 204*a*, 204*b* of the sidewall 162 of the indicator barrel 126. As discussed below, at least the indicator barrel 126 and the first and second magnets 122, 124 can be arranged such that, when the activation carrier 116 is displaced at least in the first direction from the inactivated position to the activated position, the indicator barrel 126 is rotated from a first position in which one of the first and second sides 204*a*, 204*b* of the indicator barrel 126 are viewable through the opening 180 in the indicator bezel 128 to a second position at which the other of the first and second sides 204*a*, 204*b* of the indicator barrel 126 is viewable through the opening 180 in the indicator bezel 128.

As shown by at least FIG. 9, the first side 204*a* of the indicator barrel 126 can include at least a portion of one or more first indicator symbols 206. Similarly, while, as shown by at least FIG. 10, the second side 204*b* of the indicator barrel 126 can include at least a portion of one or more second indicator symbols 208. Additionally, the first indicator symbols 206 can be different than the second indicator symbols 208, or otherwise convey to a user a different indication than the indication provided by the second indicator symbols 208. For example, in the illustrated embodiment, the exemplary first indicator symbols 206 can comprise one or more images generally depicting a closed or locked padlock, while the exemplary second indicator symbols 208 comprise one or more images generally depicting an open or unlocked padlock. However, a variety of other types of symbols can be used for the first and second indicator symbols 206, 208. Additionally, the first and second indicator symbols 206, 208 are not limited to images or illustrations, and can instead take a variety of other forms, including, for example, numbers, letter, words, characters, patterns, backgrounds, and/or colors, as well as combinations thereof, in addition to other types of symbols. Additionally, the differences between the first and second indicator symbols 206, 208 can include, or be limited to, differences in the size and/or arrangements of the first and second symbols 206, 208. Additionally, according to certain embodiments, when assembled to the first lever 102, the indicator barrel 126 can be biased by a secondary biasing element 125 (FIG. 4) to be biased to displaying either the first side 204*a* or second side 204*b* of the indicator barrel 126. For example, according to certain embodiments, the secondary biasing element could be a torsion spring or cam return that is operably coupled to the indicator barrel 126 and the indicator bezel 128 and/or the first lever 102. Alternatively, the secondary biasing element 125 could include at least one magnet that utilizes magnetic forces to attract or repel the indicator barrel 126 to a rotational position that allows the indicator barrel 126 to be in the first or second position so that an associated side 204*a*, 204*b* of the indicator barrel 126 to be seen through the opening 180 in the indicator bezel 128.

Figure 11:
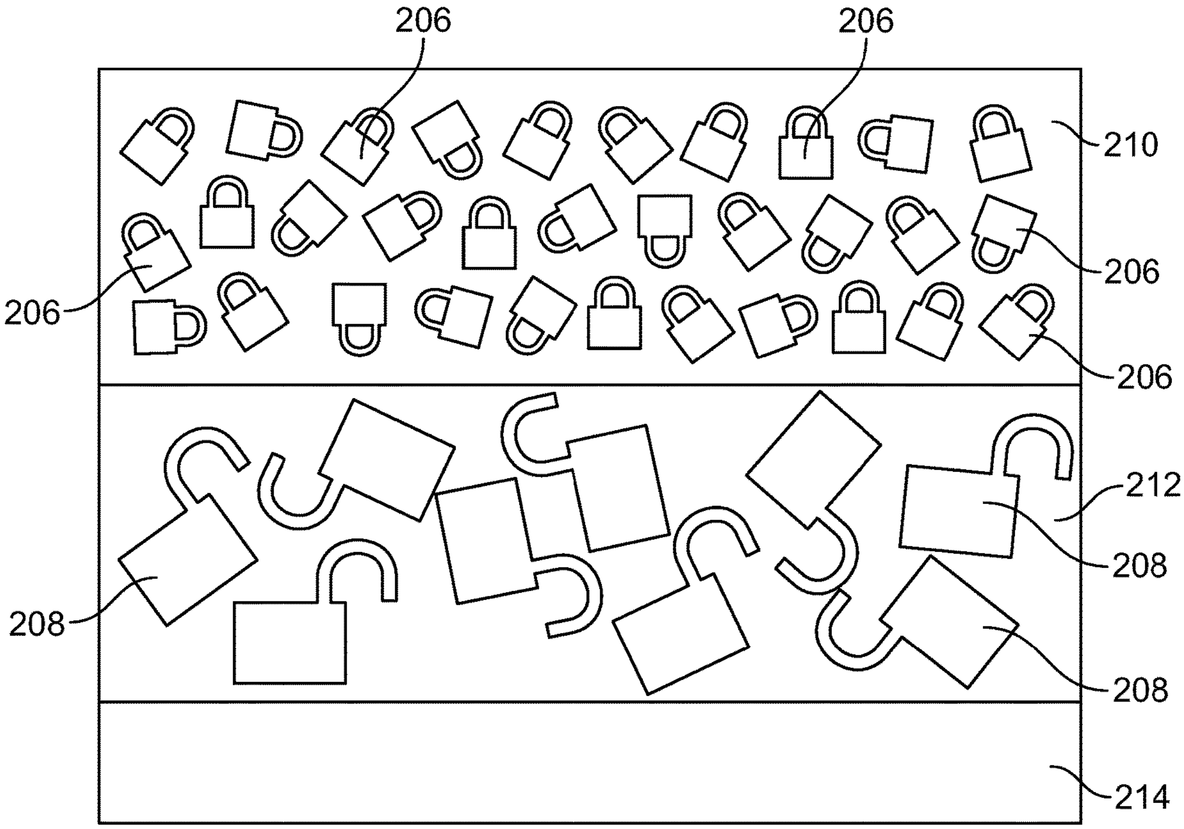
FIG. 11 illustrates a front side view of an unrolled sidewall of an indicator barrel having different sized first and second indicator symbols arranged in different patterns on different backgrounds, as well as arranged at least in a non-centered orientation.

FIG. 11 represents a flattened version of the sidewall 162 of the indicator barrel 126. As shown, the indicator barrel 126 has three zones, namely, a first zone 210, a second zone 212, and a third zone 214. The first zone 210 can occupy at least a portion of the first side 204*a* of the sidewall 162 and include one or more first indicator symbols 206, while the second zone 212 can occupy at least a portion of the second side 204*b* of the sidewall 162 and include the second indicator symbols 208. As previously discussed, in the illustrated example, the one or more first indicator symbols 206 are different from the second indicator symbols 208 with respect to the padlock image, the size of each padlock image, the number of padlock images, and the arrangement of the padlock images. According to the illustrated embodiment, when the lock assembly 100 is in a locked state or condition, the indicator barrel 126 may be oriented so that the first indicator symbols 206, and not the second indicator symbols 208, positioned on the first zone 210 on the first side 204*a* of the indicator barrel 126 are positioned to be viewable to a user of the lock assembly 100. Similarly, when the lock assembly 100 is in an unlocked state or condition, the indicator barrel 126 may be oriented so that second indicator symbols 208, and not the first indicator symbols 206, are positioned on the second zone 210 on the second side 204*b* of the indicator barrel 126 are viewable to the user. Additionally, again, the first indicator symbols 206 can have a different background than the background used with the second indicator symbols 208, such as, for example, a different background color and/or pattern. Different arrangements or orientations could also be incorporated to further differentiate the first and second indicator symbols 206, 208. For example, the one of the first and second indicator symbols 206, 208 could be arranged in a set pattern, such as, for example, in rows or diagonals, while the other of the first and second indicator symbols 206, 208 could be randomly dispersed along the associated first or second zone 210, 212. Such a mixture of orientations could also at least assist in the first and second indicator symbols 206, 208 being arranged in a manner that is suitable for installation with lock assemblies in either one of a right handed or left handed configuration.

According to certain embodiments, the first and second indicator symbols 206, 208 can be formed on and/or with the indicator barrel 126, such as, for example, formed during molding of the indicator barrel 126, among other processes of fabricating the indicator barrel 126. According to other embodiments, the first and second indicator symbols 206, 208 can be formed on a substrate that is configured to be positioned about the indicator barrel 126. Thus, according to certain embodiments, the third zone 214 can provide at least a portion of an area on the substrate at one end of the substrate that can overlap at least another portion of the substrate at an opposing end of the substrate so that the substrate can be positioned in a closed configuration about the indicator barrel 126. Accordingly, the third zone 214 can be sized to receive placement of an adhesive that is used to secure such a substrate in the closed configuration.

The opening 180 of the indicator bezel 128 can be sized and positioned to at least prevent portions of both the first and second zones 210, 212, and the first or second indicator symbols 206, 208, from being simultaneously viewable through the opening 180 of the indicator bezel 128 at least when the activation carrier 116 is at either one of the activated and inactivated positions, and/or the indicator barrel 128 is at one of the first position and the second position. Moreover, the opening 180 in the indicator bezel 128 can have a smaller size than a corresponding size of the region of the sidewall 162 of the indicator barrel 126 that is occupied by the first zone 210 and/or the second zone 212. Such a size difference between the opening 180 in the indicator bezel 128 and the corresponding portions of the sidewall 162 of the indicator barrel 126 that are occupied by the first and second zones 210, 212 can result in only a portion of either the first or second zones 210, 212, and the corresponding first or second indicator symbols 206, 208 positioned thereon, being visible through the opening 180 when the activation carrier 116 is at either one of the activated and inactivated positions. For example, the opening 180 of the indicator bezel 128 can be sized to permit a user to see through the opening 180 an area of the sidewall 162 of the indicator barrel 126 that corresponds to about 150 degrees of the periphery of the sidewall 162 of the indicator barrel 126. If the first and second zones 210, 212 each encircle about 180 degrees of the sidewall 162 of the indicator barrel 126, then each of the first and second zones 210, 212 encompass about thirty degrees of the sidewall 162 of the indicator barrel 126 that is not visible through the opening 180 of the indicator bezel 128 when the activation carrier 116 is at either one of the activated and inactivated positions. Such differences between the size of the opening 180 of the indicator bezel 128 and the size of the areas of the indicator barrel 126 occupied by the first and second zones 210, 212 can alleviate any need for the indicator barrel 126 to be completely rotated in order to prevent at portions of both the first and second zones 210, 212, and associated indicator symbols 206, 208, from being simultaneously viewable through the opening 180. Moreover, in this example, by providing such size differences, the indicator barrel 126 could, for example, be rotated to a position that is up to around 30 degrees short of a complete rotation and still only one, but not both, of the first or second zones, and their corresponding indicator symbols 206, 208, would be viewable through the opening 180 of the indicator bezel 128.

FIGS. 12A-13B illustrate the indicator assembly 110 in use with an exemplary lock assembly 100. As shown, the exemplary lock assembly 100 can include a first latch assembly portion 216, a second latch assembly portion 218, the lock chassis 104, a latch assembly 220, and a push button assembly 222. While the exemplary lock assembly 100 discussed herein includes a push button assembly 222, according to other embodiments, the lock assembly 100 can instead include a thumb turn assembly. Additionally, while specific structures are discussed herein, including structures relating to the below-discussed lock chassis 104, the lock assembly 100 can have a variety of other designs and/or use other components to operate the lock assembly 100, including, for example, other mechanical or motorized drive assemblies, among other types of lock assembly designs.

The first latch assembly portion 216 is structured to extend from one of a first and second side of an entryway device, such as, for example, an interior or exterior side of a door. Similarly, the second latch assembly portion 218 extends from the other of the first and second sides of the entryway device. The lock chassis 104 is positioned between, and coupled to, the first and second latch assembly portions 216, 218. Further, according to certain embodiments, at least a portion of the first and second latch assembly portions 216, 218, as well as at least a portion of the lock chassis 104, can extend into, or otherwise be positioned within, a through hole in the entryway device that extends along a thickness of at least a portion of the entryway device between the opposing first and second sides of the entryway device.

According to certain embodiments, the first latch assembly portion 216 can include the first lever 102, a first rose 224, and the first spring cage 106. The first rose 224 can be sized to extend over at least a portion of the first spring cage 106 so that the first rose 224 can be positioned to at least assist in covering or concealing the first spring cage 106, among other components of the lock assembly 100, from view at least when the lock assembly 100 is operably mounted or coupled to the entryway device. Thus, according to certain embodiments, the first rose 224 can provide a decorative plate or cover that can enhance the aesthetics of the lock assembly 100.

According to certain embodiments, the lock chassis 104 includes a first chassis spindle 226 that extends through at least a portion of the first spring cage 106, and which is sized for engagement with at least the first spring cage spindle 108. For example, according to certain embodiments, at least a portion of the first spring cage spindle 108 can receive insertion of the first chassis spindle 226. Further, mating portions of the first chassis spindle 226 and the first spring cage spindle 108 can have non-rounded shapes, and/or be mechanically coupled together, such as, for example, by a mechanical fastener, including, but not limited to, a pin, screw, or key, such that rotational displacement of the first spring cage spindle 108 is translated into rotational displacement of at least the first chassis spindle 226. The first spring cage spindle 108 can also be connected to the first lever 102, such that rotational displacement of the first lever 102 is translated by the first spring cage spindle 108 into rotational displacement of the first chassis spindle 226.

Similarly, the second latch assembly portion 218 can include a second lever 228, a second rose 230, and a second spring cage 232. The second rose 230 can be sized to extend over at least a portion of the second spring cage 232 so that the second rose 230 can be positioned to at least assist in covering or concealing the second spring cage 232 from view at least when the lock assembly 100 is operably mounted or coupled to the entryway device. Thus, according to certain embodiments, the second rose 230 can provide a decorative plate or cover that can enhance the aesthetics of the lock assembly 100.

According to certain embodiments, the lock chassis 104 includes a second chassis spindle 234 that extends through at least a portion of a second spring cage 232, and which is sized for engagement with at least a second spring cage spindle 236. For example, according to certain embodiments, at least a portion of the second spring cage spindle 236 can receive insertion of the second chassis spindle 234. Further, mating portions of the second chassis spindle 234 and the second spring cage spindle 236 can have non-rounded shapes, and/or be mechanically coupled together, such as, for example, by a mechanical fastener, including, but not limited to, a pin, screw, or key, such that rotational displacement of the second spring cage spindle 236 is translated into rotational displacement of at least the second chassis spindle 234. The second spring cage spindle 236 can also be connected to the second lever 228, such that rotational displacement of the second lever 228 is translated by the second spring cage spindle 236 into rotational displacement of the second chassis spindle 234.

According to the illustrated embodiment, the lock chassis 104 can engage the latch assembly 220. Moreover, the lock chassis 104 is configured such that rotation of the first or second chassis spindles 226, 234 can be translated into linear displacement of a latch bolt 238 of the latch assembly 220 between retracted and extended positions.

The push button assembly 222 can include a push button 240, a plunger assembly 242, a release button plunger 244, a locking lug 246, and a push rod 248. Further, the push button assembly 222 can be used in conjunction with the lock chassis 104 and/or latch assembly 220 to lock or unlock the lock assembly 100. Moreover, the push button assembly 222 can be configured to prevent the displacement of the latch bolt 238 of the latch assembly 220 from the extended position at least when the entryway device is in a closed position, and thus prevent displacement of the associated entryway device away from a closed position relative to the associated entryway.

Figure 12A:
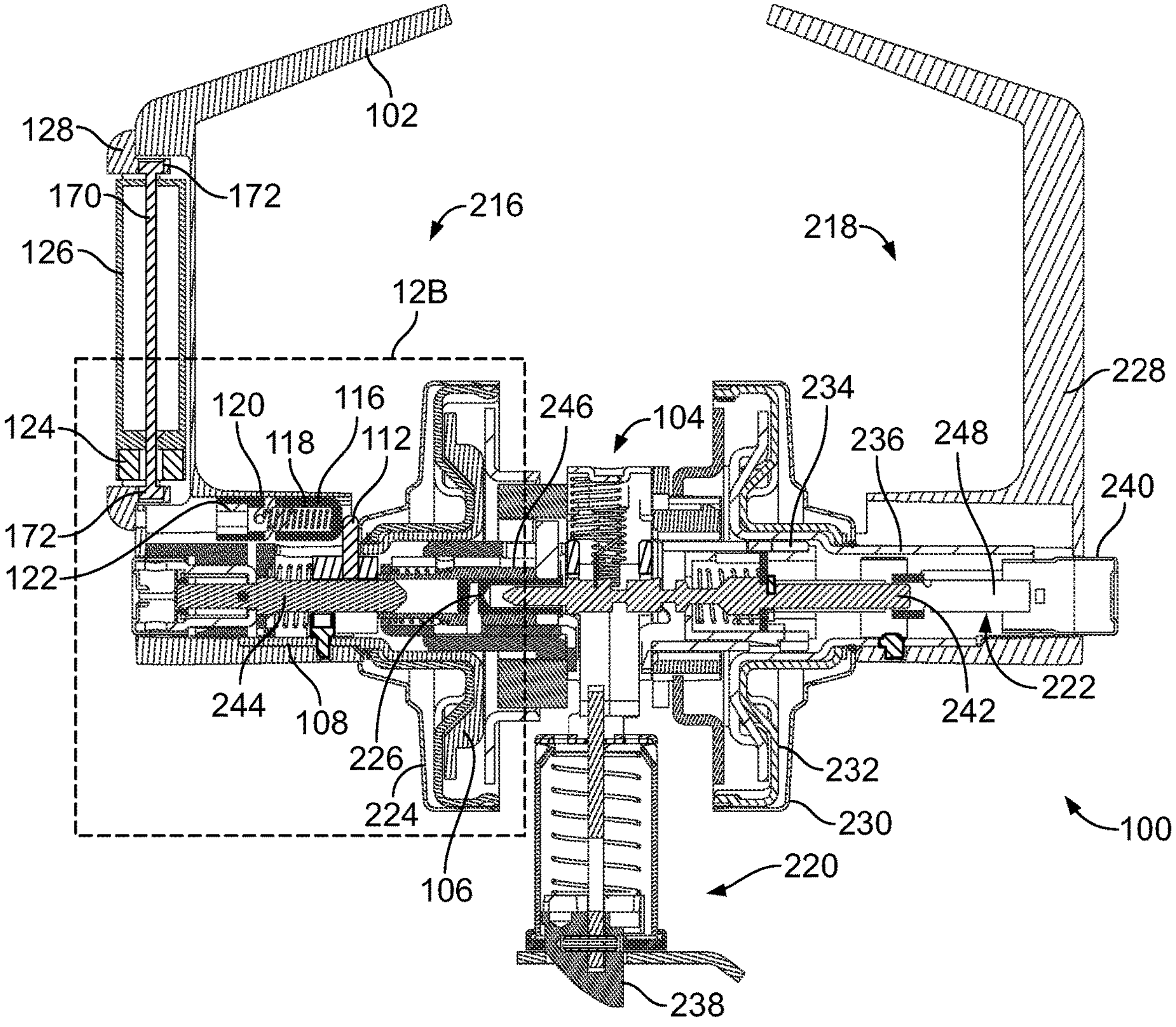
FIG. 12A illustrates a cross sectional view of a lock assembly in an unlocked condition and which includes an exemplary indicator assembly to an illustrated embodiment of the present application.
Figure 12B:
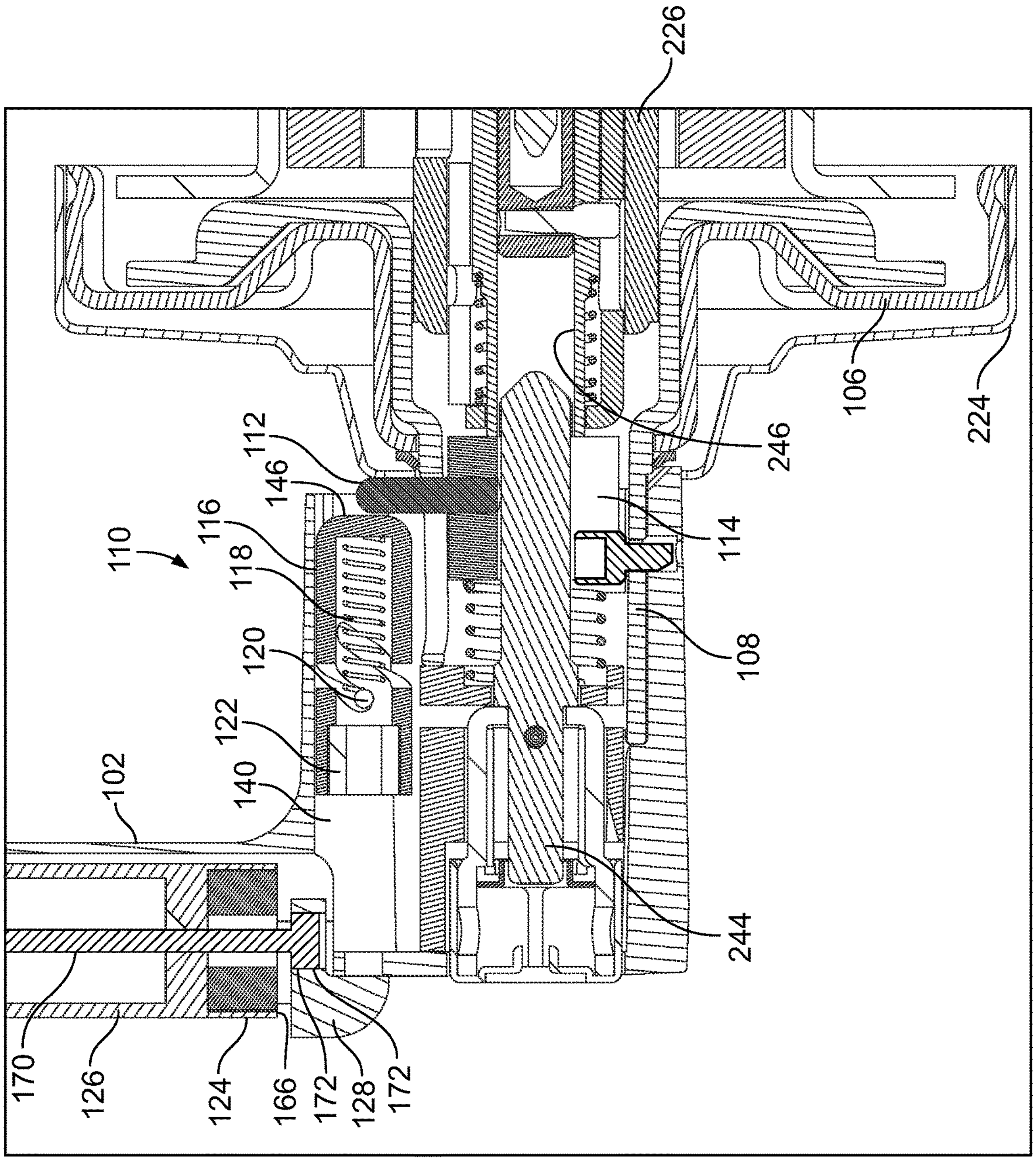
FIG. 12B illustrates a magnified cross sectional view of the portion of the indicator assembly encircled in FIG. 12A by the area identified as "12B".

FIGS. 12A and 12B depict the lock assembly 100 in an unlocked condition such that the latch bolt 238 retractable via at least rotational displacement of the first lever 102. As shown, according to the illustrated embodiment, with the lock assembly 100 in the unlocked condition, the activation carrier 116 can be at the inactive position. Additionally, according to the exemplary embodiment, the indicator barrel 126 can be at a first position within the barrel chamber 154 of the first lever 102 such that at least the one or more first indicator symbols 206 on the first zone 210 and/or first side 204*a* of the sidewall 162 of the indicator barrel 126 are visible through the opening 180 of the indicator bezel 128. For example, as previously disused, the indicator barrel 126 can be biased by the secondary biasing element 125 so that the first side 204*a* of the sidewall 162 of the indicator barrel 126 is viewable through the opening 180 in the indicator bezel 128. Additionally, as previously mentioned, in at least certain circumstances, at least a portion of the third zone 214 of the sidewall 162 can also be visible through the opening 180 of the indicator bezel 128 when the indicator barrel 126 is in the first position.

Figure 13A:
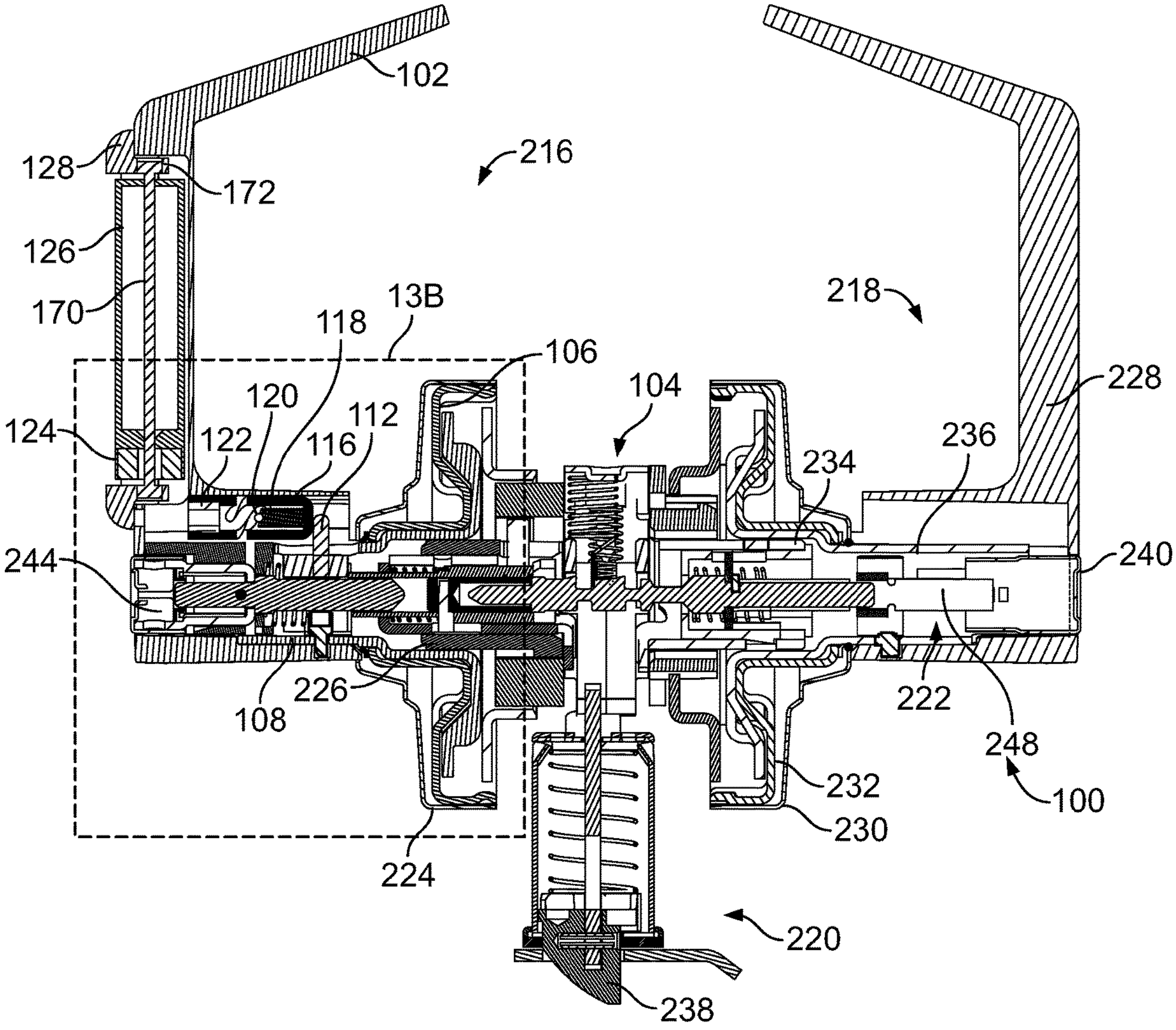
FIG. 13A illustrates a cross sectional view of a lock assembly of FIG. 12A in a locked position.

When a user elects to lock the lock assembly 100 via use of the push button assembly 222 such that the latch bolt 238 cannot be retracted using at least the first lever 102, the user may engage, such as, for example, depress, the push button 240 that is positioned in and/or extends from the second lever 228 so that the push button 240 is displaced in the first direction toward the first lever 102. As previously mentioned, although the exemplary embodiment of the subject application discusses use of a push button assembly 222, other types of assemblies, including, for example, a thumb turn assembly, could instead be used. According to certain embodiments, the linear displacement of the push button 240 in the first direction can facilitate the push button 240 pushing a push rod 248 against a plunger assembly 242 to facilitate linear displacement of the plunger assembly 242 in the first direction to a locked position, as shown in FIG. 13A. According to the illustrated embodiment, with the plunger assembly 242 in the locked position, an enlarged portion of the plunger assembly 242 can be at a position relative to the lock chassis 104 that precludes the latch bolt 238 from being retracted from the extended, or locked position via at least use of the first lever 102. For example, according to certain embodiments, the plunger assembly 242 can be displaced by engagement of the push button 240 to a position that prevents linear displacement of a slide assembly of the lock chassis 104 and/or precludes the latch assembly 220 from linearly displacing the latch bolt 238 from the extended position to the retracted position.

As the plunger assembly 242 is linearly displaced in the first direction in response to displacement of the push button 240, the plunger assembly 242 can push against the locking lug 246, causing the locking lug 246 to also be linearly displaced in the first direction. Such displacement of the locking lug 246 can result in the locking lug 246 pushing against the actuator 114 so that the actuator 114 is also linearly displaced in the first direction and away from the inactivated position of the actuator 114. Additionally, as the activation pin 112 is attached, or otherwise coupled, to the actuator 114, the activation pin 112 is also linearly displaced in the first direction with such displacement of the actuator 114. Further, as previously discussed, according to the illustrated embodiment, such displacement of the activation pin 112 can include the activation pin 112 moving through the elongated slot 132 in the first spring cage spindle 108.

Such movement of the activation pin 112 in the first direction can facilitate the displacement of the activation carrier 116 in the first direction and away from the inactivated position of the activation carrier 116. For example, the displacement of the activation pin 112 in the first direction can facilitate the activation pin 112 providing a pushing force against the rear wall 146 of the activation carrier 116 that causes the activation carrier 116 to also be displaced. However, as previously discussed, such displacement of the activation carrier 116 includes the activation carrier 116 being both displaced in the first linear direction, as well as the activation carrier 116 being rotated via the interaction of the stationary pin 120 with the helical groove 148 in the activation carrier 116. Additionally, as also previously discussed, as the activation carrier 116 is displaced in the first direction, the distance in the inner cavity 142 of the activation carrier 116 between the stationary pin 120 and the rear wall 146 of the activation carrier 116 decreases, thereby causing the biasing element 118 that is positioned therebetween to be further compressed.

Figure 13B:
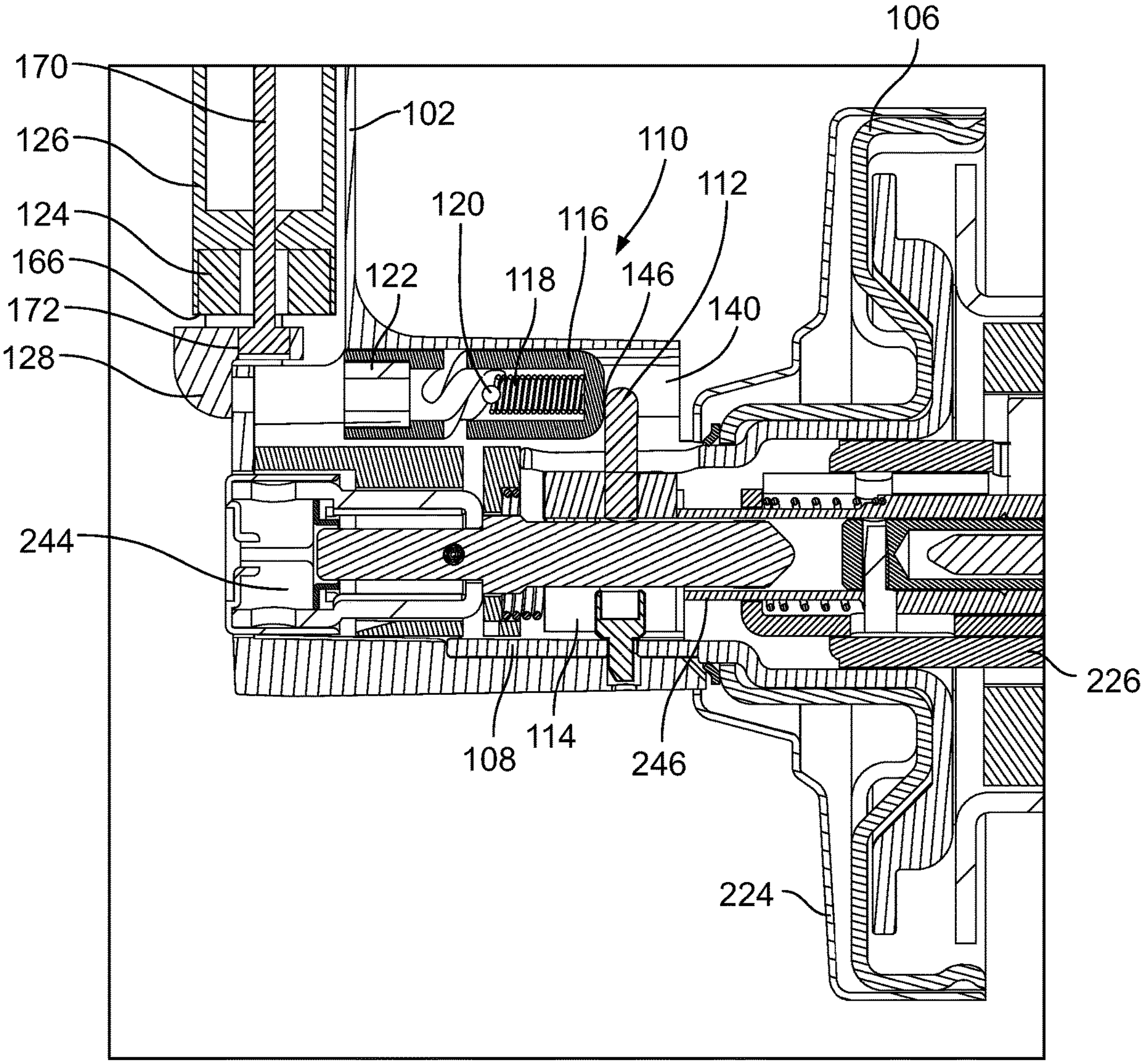
FIG. 13B illustrates a magnified cross sectional view of the portion of the indicator assembly encircled in FIG. 13A by the area identified as "13B".

According to the illustrated embodiment, the first and second magnets 122, 124 can be arranged such that, as activation carrier 116 approaches and/or arrives at the activation position of the activation carrier 116, as shown in FIGS. 13A and 13B, one of the first and second poles of the first magnet 122 can be oriented relative to one of the first and second poles of the second magnet 124 so that a magnetic force is provided to rotate the indicator barrel 126.

Further, the magnetic force provided between the first and second magnets 122, 124 can be sufficient to overcome the biasing force provided by the secondary biasing element 125. Such rotation of the indicator barrel 126 can facilitate rotation of the indicator barrel 126 from the first position at which the first side 204*a*, and at least a portion of the first indicator symbols 206 (as well as possibly a portion of the third zone 214) are viewable through the opening 180 of the indicator bezel 128, to the second position at which the second side 204*b*, and at least a portion of the second indicator symbols 208 (as well as possibly another portion of the third zone 214) are visible through the opening 180.

According to certain embodiments, the first poles of the first and second magnets 122, 124 can be negative poles, while the second poles of the first and second magnets 122, 124 can be positive poles. Additionally, the helical groove 148 in the activation carrier 116 can be configured so that the activation carrier 116 rotates while being displaced from the inactivated position to the activation position. For example, according to certain embodiments, the activation carrier 116 can rotate between around 90 and around 180 degrees via the interaction between the helical groove 148 and the stationary pin 120 as the activation carrier 116 is displaced between the activated and inactivated positions. Additionally, the second magnet 124 can be oriented in the indicator barrel 126 such that, when the indicator barrel 126 is at the first position, as biased by the secondary biasing element 125, the first pole of the second magnet 124 is generally in closer proximity to the activation carrier 116 than the second pole of the second magnet 124. According to such an embodiment, as the activation carrier 116 is displaced toward the activation position, as shown in FIGS. 13A and 13B, the activation carrier 116 is rotated so that, when the activation carrier 116 reaches the activation position, the first pole of the first magnet 122 is closer than the second pole of the first magnet 122 to the second magnet 124. Moreover, the first pole of the first magnet 122 can be brought to a position in which the first pole of the first magnet 122 is generally adjacent to the first pole of the second magnet 124. In such an embodiment, such displacement of the activation carrier 116 while the indicator barrel 126 is in the first position at least initially brings the first pole of the first magnet 122 into relatively close proximity to the first pole of the second magnet 124. However, as the first poles of the first and second magnets 122, 124 are of similar polarity, a repelling force of sufficient strength between the first poles of the first and second magnets 122, 124 is provided that overcomes the biasing force of the secondary biasing element 125 that facilitates the rotation of the indicator barrel 126 from the first position to the second position so that the opposing second pole, and not the first pole, of the second magnet 124 moved to be adjacent to the first pole of the first magnet 122.

According to the illustrated embodiment, the absence of a direct connection between the indicator barrel 126 and the activation carrier 116 and/or the push button assembly 222 prevents unauthorized unlocking of the lock assembly 100 via manipulation of the indicator barrel 126. For example, as there is an absence of a direct mechanical connection between the indicator barrel 126 and the activation carrier 116, the position of the activation carrier 116 is not adjusted by attempts to rotate the indicator barrel 126 from the second position to the first position. To the contrary, when the activation carrier 116 is at the activated position, rotation by an individual of the indicator barrel 126 from the second position and back to the first position merely temporarily adjusts the rotational position of the indicator barrel 126, but does not result in any mechanical related adjustment in the position of the activation carrier 116, actuator 114, or push button assembly 222. Further, any repelling forces between the first poles of the first and second magnets 122, 124 during an attempt to unlock the lock assembly 100 via manual rotation of the indicator barrel 126 back to the first position are insufficient to unlock the push button assembly 222, including insufficient to facilitate movement of the activation carrier 116, actuator 114, locking lug 246, and plunger assembly 242 to positions that can cause the unlocking of the lock assembly 100. Further, in such situations, once the individual has release the indicator barrel 126, the repelling forces between the first poles of the first and second magnets 122, 124 will return the indicator barrel 126 back to the second position, wherein the second pole of the second magnet 124 is again adjacent to the first pole of the first magnet 122.

When the lock assembly 100 is to be unlocked, such as, for example, via turning of the second lever 228 or depression of the release button plunger 244 in the first lever 102, the actuator 114, locking lug 246, plunger assembly 242, push rod 248, and push button 240 may be linearly displaced in a second direction that is opposite of the first direction. Accordingly, the activation pin 112 may no longer provide a force that maintains the activation carrier 116 in the activated position (FIG. 13B). Accordingly, the biasing element 118 can provide a force, such as, for example, a force associated with the decompression of the biasing element 118, that facilitates the activation carrier 116 being at least linearly displaced in the second direction to the inactivated position (FIG. 12B). Such displacement of the activation carrier 116 can also result in the activation carrier 116 being rotated via the engagement of the helical groove 148 with the stationary pin 120. Such rotation of the activation carrier 116 as the activation carrier 116 is also displaced in the second direction can be opposite to the direction at which the activation carrier 116 rotated when the activation carrier 116 was displaced in the first direction. Such linear and rotational displacement of the activation carrier 116 can result in the repelling force between the first poles of the first and second magnets 122, 124 being removed and/or dissipated to a level that the secondary biasing element 125 can overcome. Thus, the secondary biasing element 125 can then facilitate the rotation of the indicator barrel 126 back to the first position. Alternatively, or additionally, the first magnet 122 can be rotated such that, when the activation carrier 116 is in the inactivated position, the second pole of the first magnet 122 is at a position that repels that second pole of the second magnet 124, thereby at least assisting in the indicator barrel 126 being rotated back to the first position.

While the illustrated embodiment is discussed in terms of the activation carrier 116 being both linearly and rotatably displaced between the activated and inactivated positions, according to other embodiments, the activation carrier 116 may instead just be linearly displaced. Such embodiments may therefore eliminate the use of the stationary pin 120 and the helical groove 148. Additionally, according to such embodiments, the first magnet 122 can be positioned in the activation carrier 116, or otherwise coupled to the activation carrier 116, at an orientation such that the first pole of the first magnet 122 is positioned to be adjacent to second magnet 124 when the activation carrier 116 is at the activation position, and generally retains such an orientation relative to the activation carrier 116 when the activation carrier 116 is also at the inactivated position.

FIGS. 14-18B illustrate an indicator mechanism assembly 300 according to another illustrated embodiment of the subject application. As shown, the indicator mechanism assembly 300 can be coupled to a portion of a thumb turn assembly. Similar to the previously discussed push button assembly 222, the thumb turn assembly can be configured to lock and/or unlock a latch bolt 238 at/from an extended position. According to the illustrated embodiment, the indicator mechanism assembly 300 includes an escutcheon 302, a cover plate 304, an indicator plate 306, a cam 308, and a rear case 310. The escutcheon 302 can include, or otherwise be coupled to, a thumb turn 312 of the thumb turn assembly. The thumb turn 312 can be configured to be rotated by a user between an unlocked and a locked position, the locked position of the thumb turn being associated with the thumb turn assembly locking the latch bolt 238 in the extended locked position, and the unlocked position of the thumb turn 312 being associated with the thumb turn assembly not prohibiting the retraction of the latch bolt 238 from the extended position by rotation of at least one of the first and second levers 102, 228.

Figure 14:
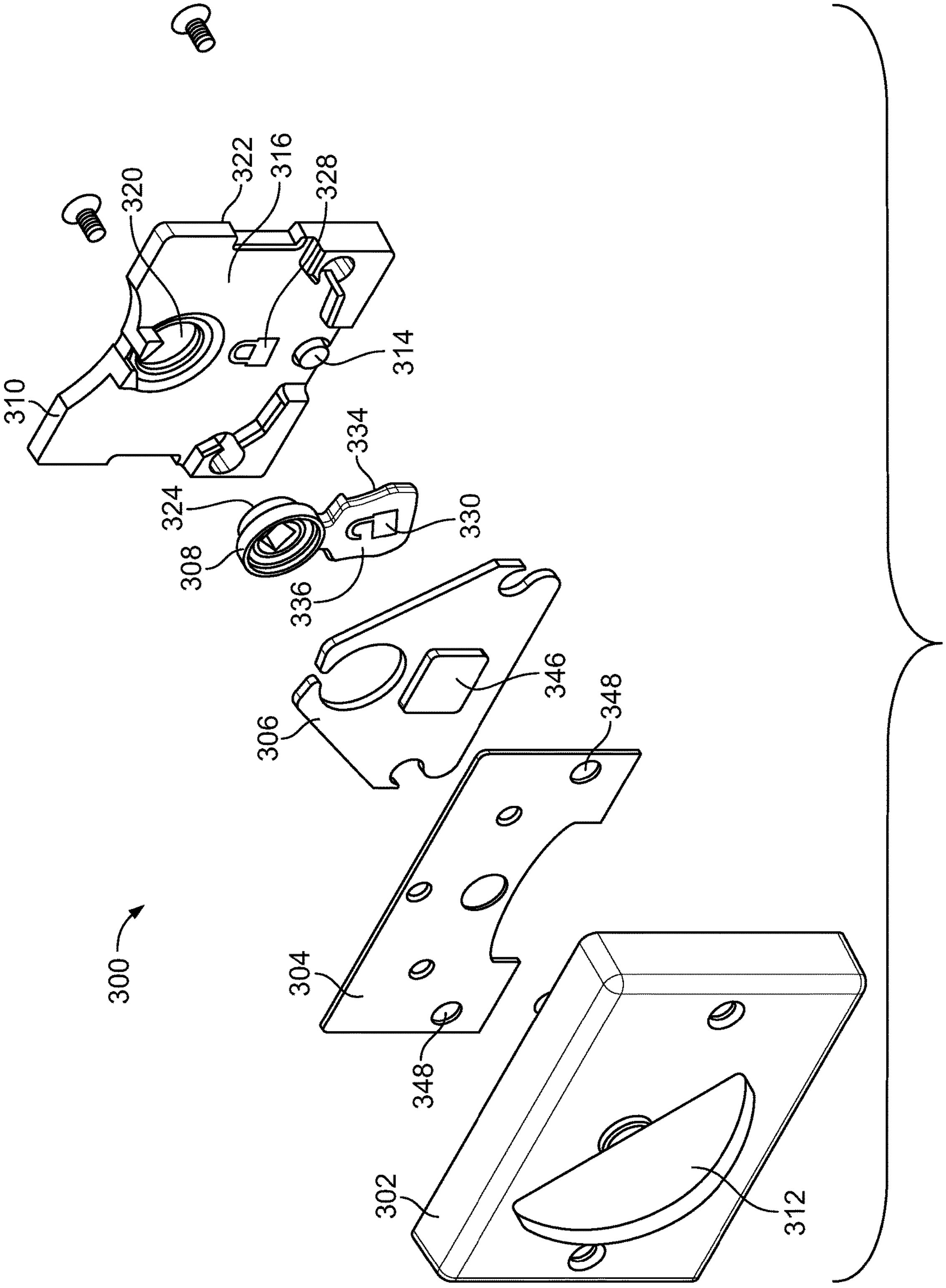
FIG. 14 illustrates an exploded front side perspective view of an indicator mechanism assembly according to an illustrated embodiment of the subject application.
Figure 15:
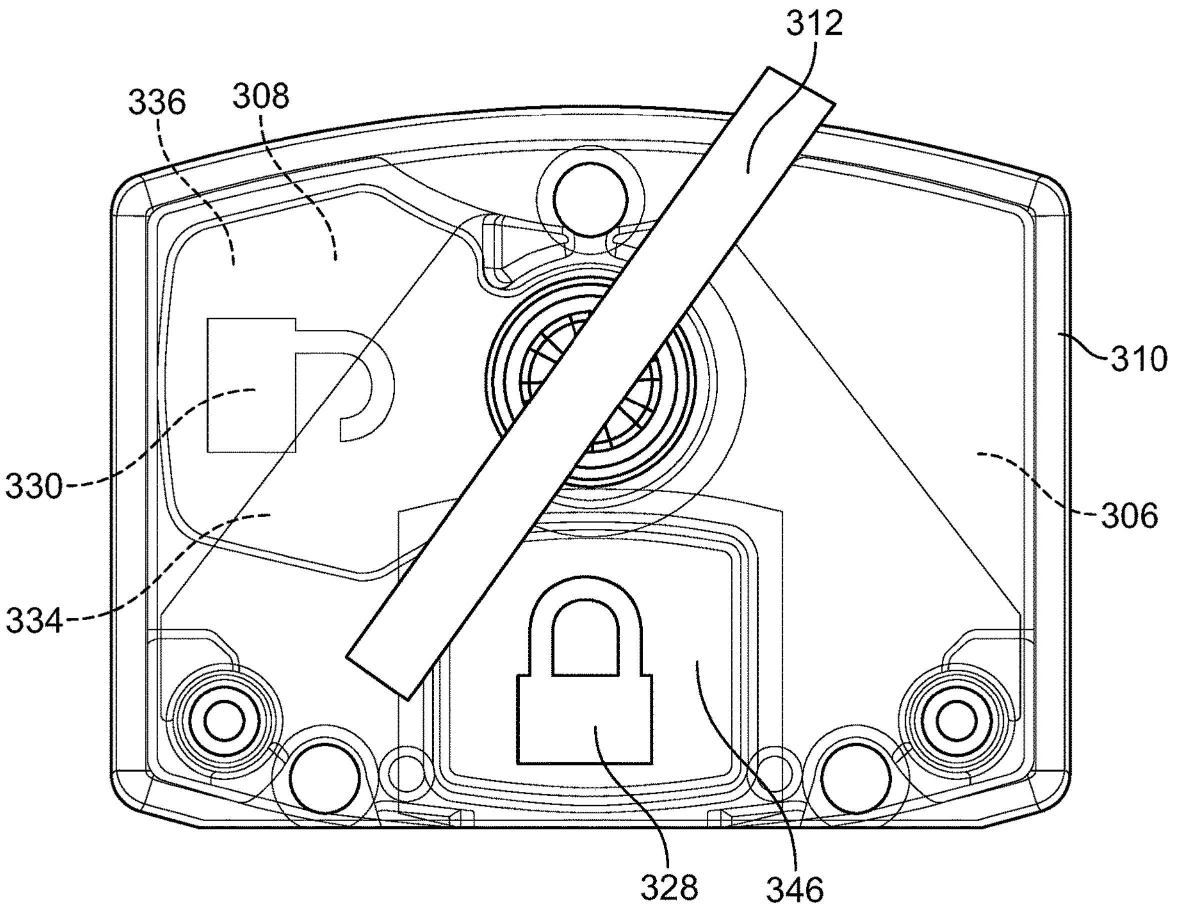
FIG. 15 illustrates a front side view of a portion of the indicator mechanism assembly shown in FIG. 14 coupled to a portion of a thumb turn assembly.
Figure 16:
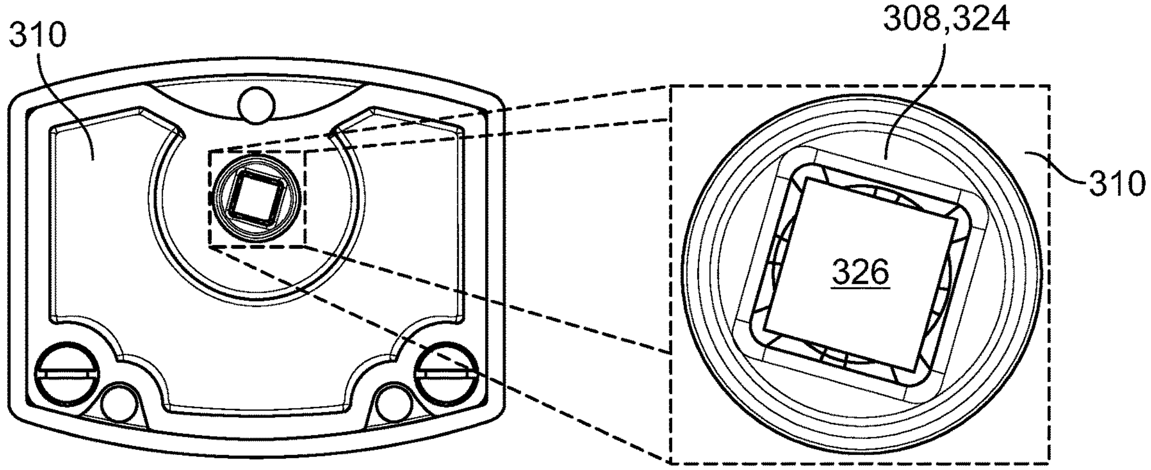
FIG. 16 illustrates a rear side view of the indicator mechanism assembly shown in FIG. 14 coupled to a portion of a thumb turn assembly.
Figure 17:
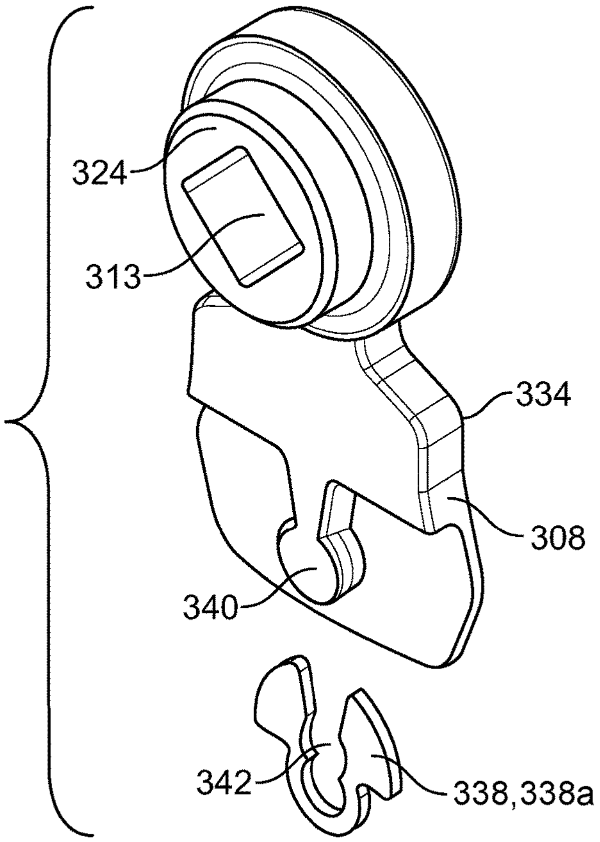
FIG. 17 illustrates a rear side perspective view of an exemplary cam and ferromagnetic body of the indicator mechanism assembly shown in FIG. 14.
Figure 18A:
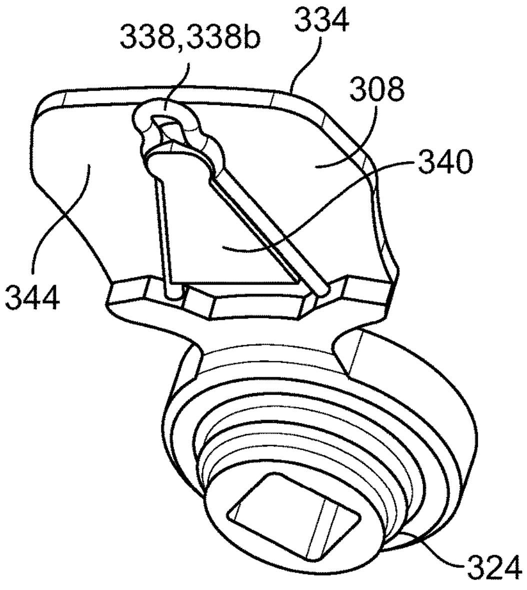
FIG. 18A illustrates a bottom side perspective side view of an exemplary cam of the indicator mechanism assembly shown in FIG. 14 coupled to a ferromagnetic body in the form of a hairpin clip.
Figure 18B:
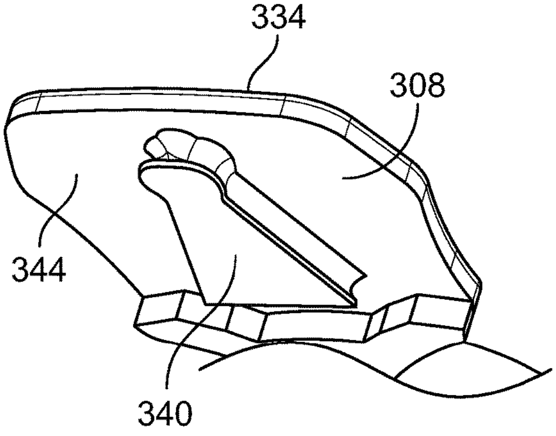
FIG. 18B illustrates a bottom side perspective side view of the exemplary cam shown in FIG. 18A.
Figure 19A:
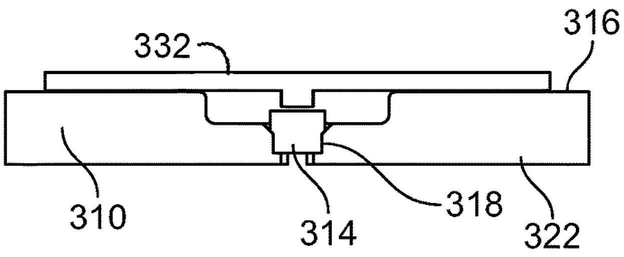
FIGS. 19A and 19B illustrate a bottom side view and a bottom side perspective view, respectively, of an exemplary rear case coupled to a magnet and a clear cover of the indicator mechanism assembly shown in FIG. 14.
Figure 19B:
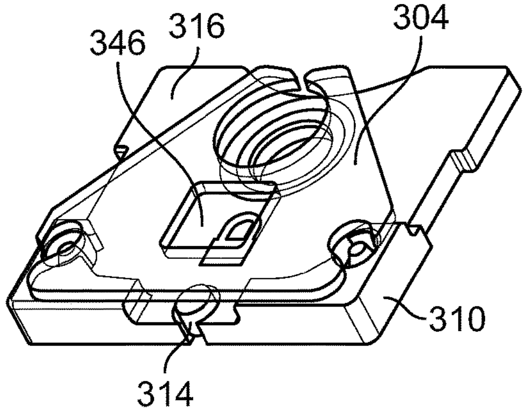

As shown by at least FIGS. 14, 19A, and 19B, the rear case 310 can be coupled to a magnet 314 such that the magnet 314 is positioned around, or at least in proximity to, at least a first side 316 of the rear case 310. For example, according to the illustrated embodiment, the rear case 310 can include an aperture 318 that is sized to receive secure placement of the magnet 314. The rear case 310 can also include an opening 320 that extends between the first and second sides 316, 322 of the rear case 310, and through which a portion of a hub 324 of the cam 308, as well as a portion of a spindle 326 of the thumb turn assembly and/or thumb turn 312 can be positioned. Moreover, the opening 320 can be sized to at least assist in guiding the rotational displacement of the cam 308 between positions associated with the thumb turn 312 being rotated between the locked and unlocked positions. Additionally, according to the illustrated embodiment, the first side 316 of the rear case 310 can include a first indicator symbol 328, while a second indicator symbol 330 is positioned on the cam 308, the second indicator symbol 330 being different than the first indicator symbol 328. For example, according to the illustrated embodiment, the first indicator symbol 328 can be an image of a locked padlock, while the second indicator symbol 330 can be an image of an unlocked padlock. As shown by FIG. 19A, according to certain embodiments, the first side 316 of the rear case 310 can be attached to a cover 332, such as, for example, an acrylic plate, that can be configured to at least assist in retaining a position of the magnet 314 relative to rear case 310, including, for example, assist in retaining the magnet 314 in the aperture 318. Additionally, according to certain embodiments, the cover 332 can be the cover plate 304.

The cam 308 can include a body portion 334 that extends from the hub 324. Additionally, the hub 324 can extend about an opening 313 in the cam 308 that is sized to receive at least a portion of the spindle 326 thumb turn 312, or receive another portion of the thumb turn assembly. The first indicator symbol 328 can be positioned on the first side 336 of the body portion 334. The cam 308 can also be attached to, or otherwise include, a ferromagnetic body 338. For example, according to the embodiment depicted in FIGS. 17-18B, the ferromagnetic body 338 can be a retaining clip 338*a* or hair pin clip 338*b* that is configured to be attached to a connection body 340 of the body portion 334 of the cam 308, as such as, for example, a connection body 340 on a second side 344 of the body portion 334 of the cam 308. Moreover, the ferromagnetic body 338 can be sized so that an opening 342 of the ferromagnetic body 338 can be at least partially expanded to a degree that accommodates placement of at least portions of the ferromagnetic body 338 about the connection body 340. According to such an embodiment, when the ferromagnetic body 338 is matingly secured to the connection body 340, the ferromagnetic body 338 can exert a compression force against the connection body 340 to a level that retains secure engagement between the ferromagnetic body 338 and the connection body 340.

The indicator plate 306 can be coupled to the rear case 310 and includes a window 346 through which at least one of the first and second indicator symbols 328, 330 can be seen. Moreover, the window 346, cam 308, and first and second indicator symbols 328, 330 can be configured such that when the thumb turn 312 is at one of the a locked position or an unlocked position, one of the first and second indicator symbols 328, 330 is positioned to be viewed through the window 346. Thus, the cover plate 304, which can be a UL plate, can be positioned adjacent to the indicator plate 306, and can thus be configured to not block at least the window indicator plate 306 from view when the indicator mechanism assembly 300 is assembled. As also illustrated, the cover plate 304 can include a plurality of apertures 348 that can at least assist in the indicator mechanism assembly 300 being horizontally mounted. The escutcheon 302 can also provide an opening through which at least the window 346 of the indicator plate 306, and thus one of the first and second indicator symbols 328, 330, can be viewed.

The magnet 314 and the ferromagnetic body 338 can be configured to prevent the cam 308, and thus the first indicator symbol 328, from being at a position at which portions of both the first and second indicator symbols 328, 330 are simultaneously viewable through the window 346. For example, as indicated by at least FIG. 16, the opening 313 of the cam 308 and the spindle 326 of the thumb turn 312 may both have squared cross sectional shapes that can assist with the cam 308 being rotated via rotation of the thumb turn 312. However, differences in the sizes of the cross sectional shapes of the spindle 326 of the thumb turn 312 and/or manufacturing tolerances, among other factors or possibilities, can result in the cam 308 not being rotated completely at least when the thumb turn is completely at one of its locked position or unlocked position. For example, differences in sizes between the spindle 326 and the opening 313 of the cam 308 can result in the spindle 326 being rotatable to some degree within the opening 313 of the cam 308 without the spindle 326 operably engaging the walls the define the opening 313 of the cam 308 in a manner that causes the cam 308 to rotate. Thus, to at least some degree, the spindle 326 can be rotated to some degree before the spindle 326 reaches a point at which the spindle 326 engages the cam 308 in a manner that initiates the rotation of the cam 308. Conversely, such differences in sizes can result in the spindle 326 being fully rotated to one of the locked or unlocked position, but the cam 308 not reaching, or being placed, in a position that corresponds to the final, complete rotation position of the cam 308. For example, such issues can result in the cam 308 being at a position that is about 10 degrees to about 15 degrees away from a position that corresponds to the fully rotated position the cam 308. As a consequence, in at least certain situations in which the cam 308 is to be at an indicator position at which the cam 308 at least completely blocks the first indicator symbol 328 from view through the window 346, the cam 308 may instead be at a generally intermediate position at which the user may be able to view at least portions of both the first and second indicator symbols 328, 330. To prevent such issues, one or both of the magnet 314 and the ferromagnetic body 338 can be positioned and/or sized so that a magnetic force, such as an attraction force, is provided therebetween that can facilitate the cam 308 being magnetically pulled, or otherwise rotated, to the full rotation position such that the cam 308 at least blocks the first indicator symbol 328 from view through the window 346 and/or the entire second indicator symbol 330 is completely viewable.

Figure 20:
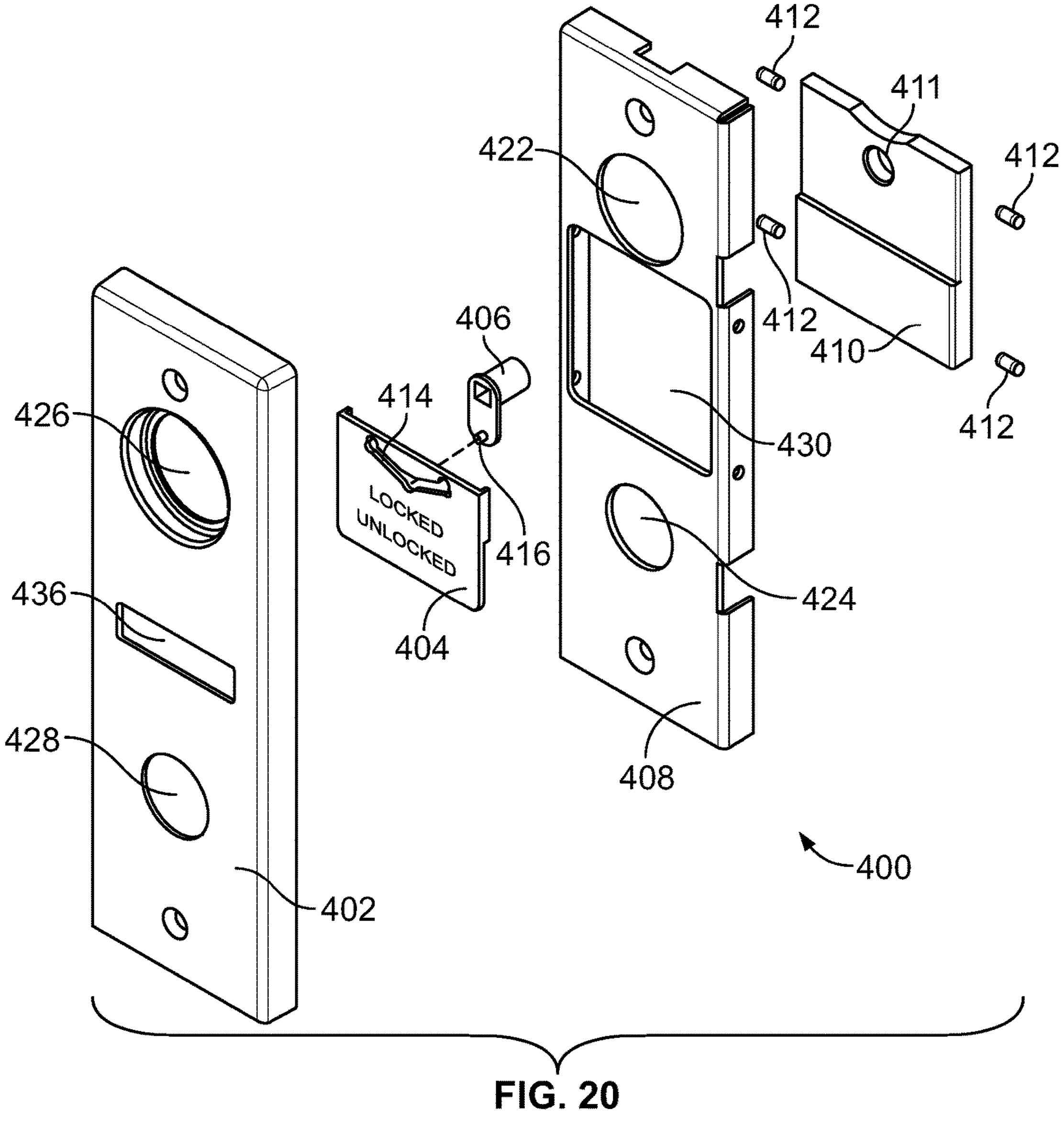
FIG. 20 illustrates an exploded front side perspective view of an indicator mechanism assembly according to an illustrated embodiment of the subject application.
Figure 21A:
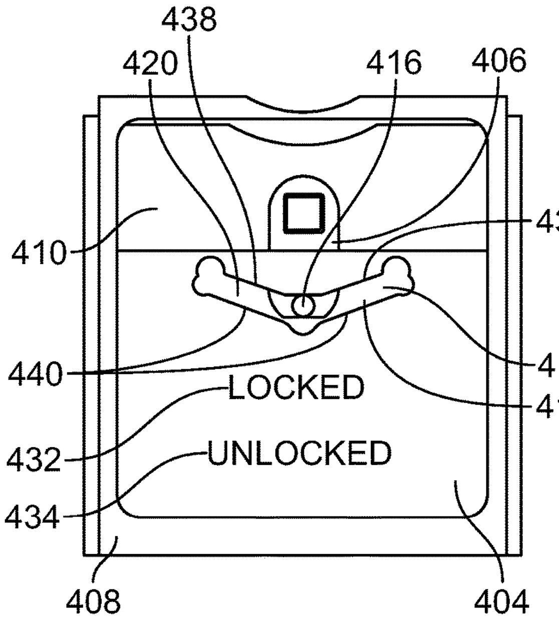
FIGS. 21A and 21B illustrate a portion of the assembled indicator mechanism assembly of FIG. 20 in a locked indication position and an unlocked indication position, respectively.
Figure 21B:
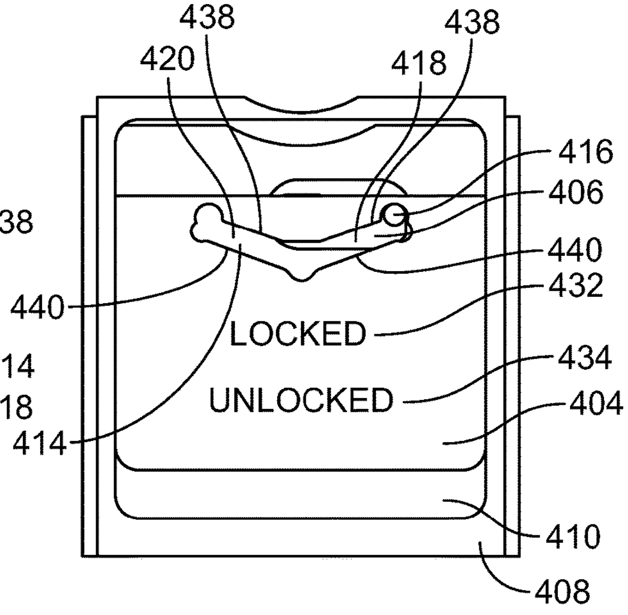
Figure 22:
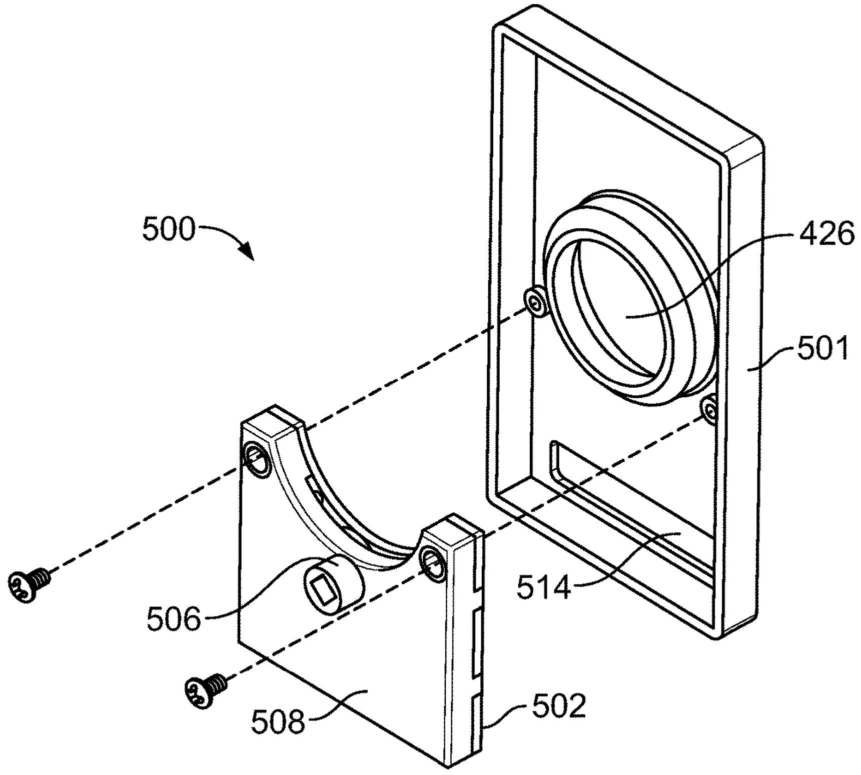
FIG. 22 illustrates an exploded front side perspective view of an indicator mechanism assembly according to an illustrated embodiment of the subject application.
Figure 23:
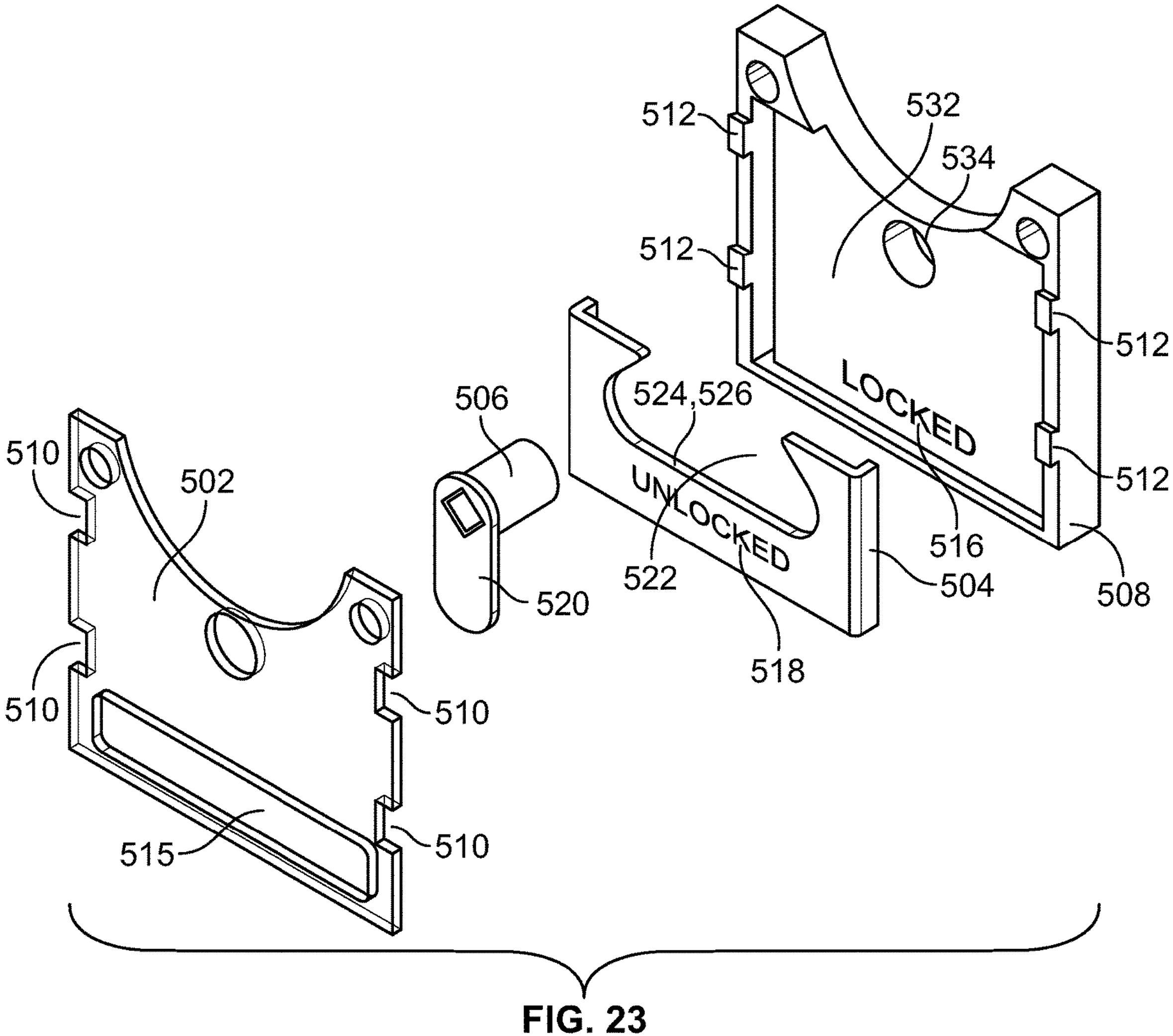
FIG. 23 illustrates an exploded front side perspective view of a portion of the indicator mechanism assembly shown in FIG. 22.

FIGS. 20-21B illustrate an indicator mechanism assembly 400 according to another illustrated embodiment of the subject application. The indicator mechanism assembly 400 can include a cover 402, an indicator plate 404, a cam 406, a guide plate 408, a rear cover plate 410, and one or more rear cover plate springs 412. Although shown as separate components, according to certain embodiments, the cover 402 and the guide plate 408 can be a single, unitary component. The cam 406 can include a protrusion 416 that extends in a direction that is generally parallel to an axis of rotation and the cam 406, and which is positioned in a slot 414 in the indicator plate 404. Although the slot 414 is illustrated as having a first ramp 418 and an opposing second ramp 420 that provide the slot 414 with a generally "V" shape, the slot 414 can have a variety of other shapes. Additionally, although the slot 414 is illustrated as having both first and second ramps 418, 420, according to certain embodiments the slot 414 may have one, but not both, of the first and second ramps 418, 420. Moreover, as discussed below, the inclusion of first and second ramps 418, 420 allows the option of the cam 406 being rotated in one of two directions to lift, or otherwise upwardly displace, the indicator plate 404.

The guide plate 408 is configured to be covered by the cover 402, and can include openings 422, 424 that correspond to openings 426, 428 in the cover 402 that relate to a lock assembly. For example, an opening 422, 426 in each of the guide plate 408 and the cover 402 can correspond to the location of the placement of a portion of the lever, spring cage, and/or other components of the lock assembly, while another opening 424, 428 can correspond to components related to a thumb turn assembly, push button assembly, or lock cylinder, among other components. The guide plate 408 can also include an elongated aperture 430 that can receive placement of at least one of the indicator plate 404 and the rear cover plate 410. According to certain embodiments, the aperture 430 is sized to accommodate and/or guide the linear vertical displacement of the indicator plate 404 between a first position and a second position. The one or more rear cover plate springs 412 can be positioned at least between an outer sidewall of the rear cover plate 410 and the guide plate 408.

The indicator plate 404 can include a first indicator symbol 432 and a second indicator symbol 434 that are vertically offset from each other, and which can each provide a different information or indication. For example, according to the illustrated embodiment, the first indicator symbol 432 can be the term "UNLOCKED", while the second indicator symbol 434 can be the term "LOCKED", and can correspond to a locked or unlocked status of the associated lock assembly. Additionally, the cover 402 can include an indicator opening 436 through which one of the first and second indicator symbols 432, 434 is visible from a position external to the indicator mechanism assembly 400.

The cam 406 can extend through an opening 411 in the rear cover plate 410, and can be rotated in a variety of different manners. According to the illustrated embodiment, the cam 406 can include an opening, such as, but not limited to, a square cross sectional shaped opening, that receives the spindle 326 such that rotation of the thumb turn 312 facilitates rotation of the cam 406. As shown in FIG. 21A, when the cam 406 is at a first rotation position, the protrusion 416 of the cam 406 can be generally located at a base location of the slot 414 of the indicator plate 404. With the protrusion 416 at the base location, the first indicator symbol 432, in this example the word "LOCKED", can be positioned to be viewable through the indicator opening 436 in the cover 402. Accordingly, the indicator mechanism assembly 400 can be configured in the illustrated example for the cam 406 to be placed at the first rotation position when the latch bolt 238 is placed in the condition in which the latch bolt 238 is locked in the extended position.

If the locked latch bolt 238 is subsequently unlocked, such unlocking can facilitate the cam 406 being rotated to a second rotation position that corresponds to the indicator plate 404 being lifted to a position at which the second indicator symbol 434, and not the first indicator symbol 432, is viewable through the indicator opening 436 in the cover 402. For example, as the illustrated embodiment of the indicator plate 404 accommodates bi-directional rotation of the cam 406 to the second rotation position, rotation of the cam 406 in one of a right or left direction from the first rotation position to the second rotation position can result in the protrusion 416 of the cam 406 exerting a generally upward force against an upper wall 438 of either the first or second ramp 420. The force provided by the protrusion 416 against the upper wall 438 can generally vertically displace the indicator plate 404 in an upward direction so that the second indicator symbol 434, in this example the word "UNLOCKED", is lifted to a positioned to be viewable through the indicator opening 436 in the cover 402.

If the unlocked latch bolt 238 is to be subsequently locked in the extended position, the locking of the latch bolt 238 can facilitate the cam 406 being rotated in a direction that results in the protrusion 416 exerting a generally downward force against a lower wall 440 of one of the first and second ramps 418, 420 that pushes the indicator plate 404 in a generally downward vertical direction. As the protrusion reaches the base portion of the slot 414, the force provided by the protrusion 416 against the lower wall 440 can generally lower the indicator plate 404 so that the first indicator symbol 432, and not the second indicator symbol 434, is viewable through the indicator opening 436 in the cover 402.

FIGS. 22-24B illustrate an indicator mechanism assembly 500 according to another illustrated embodiment of the subject application. The indicator mechanism assembly 500 can include an outer cover 501, an inner cover 502, an indicator plate 504, a cam 506, and a rear case 508. According to certain embodiments, the inner cover 502 can be constructed of a transparent material. Further, the indicator plate 504 can include one or more apertures (not shown) that can matingly receive protrusions 512 of the rear case 508 to provide a snap fit arrangement therebetween that at least assists in retaining the inner cover 502 to rear case 508. The outer cover 501 can be coupled to at least the rear case 508 by one or more mechanical fasteners, including, for example, screws and include an indicator opening 514 positioned to accommodate external visual access to a first indicator symbol 516 on the indicator plate 504, or a second indicator symbol 518 on the rear case 508. Similarly, the inner cover 502 can also include an indicator opening 515 that is positioned for alignment with the indicator opening 514 of the outer cover 501.

The cam 506 can include a protrusion 520 that extends in a direction that is generally orthogonal to a central axis of rotation of the cam 506, and which is positioned in an opening 522 in the indicator plate 504 that is generally defined by an indicator cam wall 524 of the indicator plate 504. As shown, the indicator cam wall 524 includes a base cam wall 526 that is positioned between a pair of opposing cam wall ramps 528. Although the cam wall ramps 528 are illustrated as each having inwardly tapered extensions 530, the cam wall ramps 528 can have a variety of other shapes. Additionally, although the indicator cam wall 524 is illustrated as two cam wall ramps 528, according to certain embodiments, the indicator cam wall 524 can have only one cam wall ramp. Moreover, as discussed below, the inclusion of a cam wall ramp 528 at either end of the base cam wall 526 allows for the option of the cam 506 being rotated in one of two directions to lift, or otherwise upwardly displace, the indicator plate 504.

The rear case 508 includes a cavity 532 that can receive placement of the indicator plate 504. According to certain embodiments, the cavity 532 is sized to accommodate and/or guide the linear vertical displacement of the indicator plate 504 between a first position at which the first indicator symbol 516 on the rear case 508, and not the second indicator symbol 518, is viewable through an indicator opening 514 in the outer cover 501, and a second position at which the second indicator symbol 518 on the indicator plate 504, and not the first indicator symbol 516, is viewable through the indicator opening 514. According to the illustrated embodiment, the first indicator symbol 516 can be the term "UNLOCKED", while the second indicator symbol 518 can be the term "LOCKED", and each can correspond to a locked or unlocked status of the associated lock assembly.

Figure 24A:
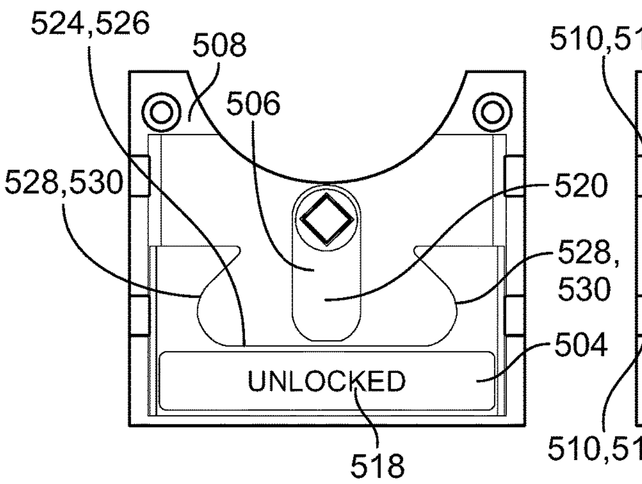
FIGS. 24A and 24B illustrate a front side view of a portion of the indicator mechanism assembly shown in FIG. 22 in an unlocked position and a locked position, respectively.
Figure 24B:
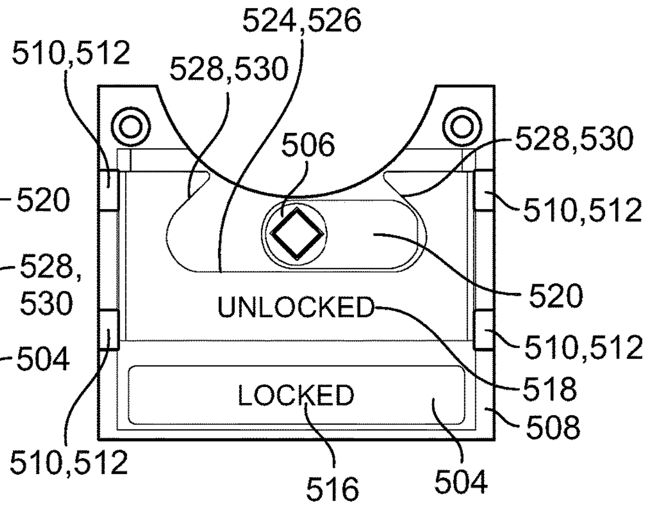

The cam 506 can extend through an opening 534 in the rear case 508, and can be rotated in a variety of different manners. According to the illustrated embodiment, the cam 506 can include an opening, such as, but not limited to, a square cross sectional shaped opening, that receives the spindle 326 such that rotation of the thumb turn 312 facilitates rotation of the cam 506. As shown in FIG. 24A, when the cam 506 is at a first rotation position, the protrusion 520 of the cam 506 can abut the base cam wall 526 of the indicator plate 504. In such a situation, the second indicator symbol 518, in this example the word "UNLOCKED" can be positioned to be viewable through the indicator opening 514 in the outer cover 501.

If the latch bolt 238 is subsequently locked, such locking can be facilitate the cam 506 being rotated to a second rotation position that corresponds to the indicator plate 504 being generally vertically lifted to a position in which indicator plate 504 does not block the first indicator symbol 516 from view through the indicator opening 514 in the inner cover 502. For example, as in the illustrated embodiment the indicator plate 504 includes a pair of cam wall ramps 528, the indicator plate 504 can accommodate bi-directional rotation of the cam 506. Moreover, rotation of the cam 506 from the first rotation position to a second rotation position can be accomplished via rotation of the cam 506 in either one of a right or left direction from the first rotation position to the second rotation position. As the cam 506 is rotated to the second rotation position, the cam wall ramp 528 is configured for the protrusion 520 of the cam 506 to exert a generally upward force against the cam wall ramp 528 that facilitates the generally upward vertically displacement of the indicator plate 504. Such lifting of the indicator plate 504 moves the second indicator symbol 518 from view and reveals the first indicator symbol 516, which had been behind the indicator plate 504 on the rear case 508.

If the unlocked latch bolt 238 is to be subsequently locked in the extended position, the locking of the latch bolt 238 can facilitate the cam 506 being rotated to a position where the cam 506 exerts a generally downward force at least against the base cam wall 526 that results in the displacement of the indicator plate 504 in a generally downward vertical direction. Such lowering of the indicator plate 504 moves the second indicator symbol 518 into position to be viewed through the indicator opening 514 in the outer cover 501, and results in the indicator plate 504 covering the first indicator symbol 516 so that the first indicator symbol 516 cannot be seen through the indicator opening 514 in the outer cover 501.

The exemplary indicator mechanism assembly 500 shown in FIGS. 22-24B depict an arrangement in which the first and second indicator symbols 516, 518 are visible through an indicator opening 514 in a lower portion of the outer cover 501. Moreover, in the illustrated the configuration, the indicator plate 504 is lowered to cover the first indicator symbol 516 on the rear case 508. Alternately, as shown by the exemplary indicator mechanism assembly 500' shown in FIGS. 25-26, the first and second indicator symbols 516, 518 can be positioned at upper locations on the rear case 508' and indicator plate 504', respectively, such that, when the indicator plate 504' is raised, the indicator plate 504' is positioned to block the first indicator symbol 516 on the rear case 508' from view, and the second indicator symbol 518 is viewable through the indicator opening 514', which is positioned in an upper portion of the outer cover 501'. Conversely, when the indicator plate 504' is lowered via operation of the cam 506, such as the cam 506 engaging the base cam wall 526, the indicator plate 504' is lowered to a position at which the second indicator symbol 518 is no longer viewable through the indicator opening 514'. Moreover, the lowering of the indicator plate 504' moves the indicator plate 504' to a position at which the indicator plate 504' no longer is blocking the first indicator symbol 518 from being visible through the indicator opening 514'.

Figure 25:
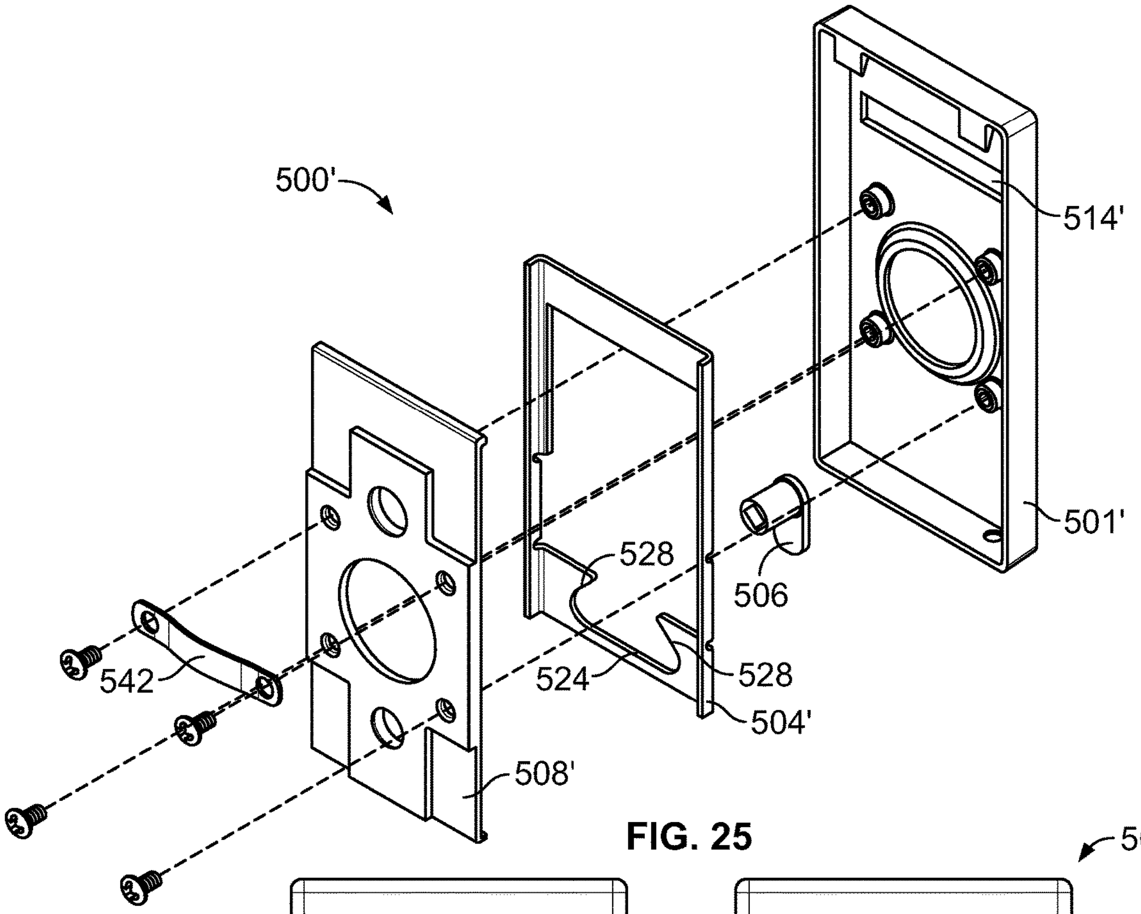
FIG. 25 illustrates an exploded front side perspective view of an indicator mechanism assembly according to an illustrated embodiment of the subject application.
Figure 26:
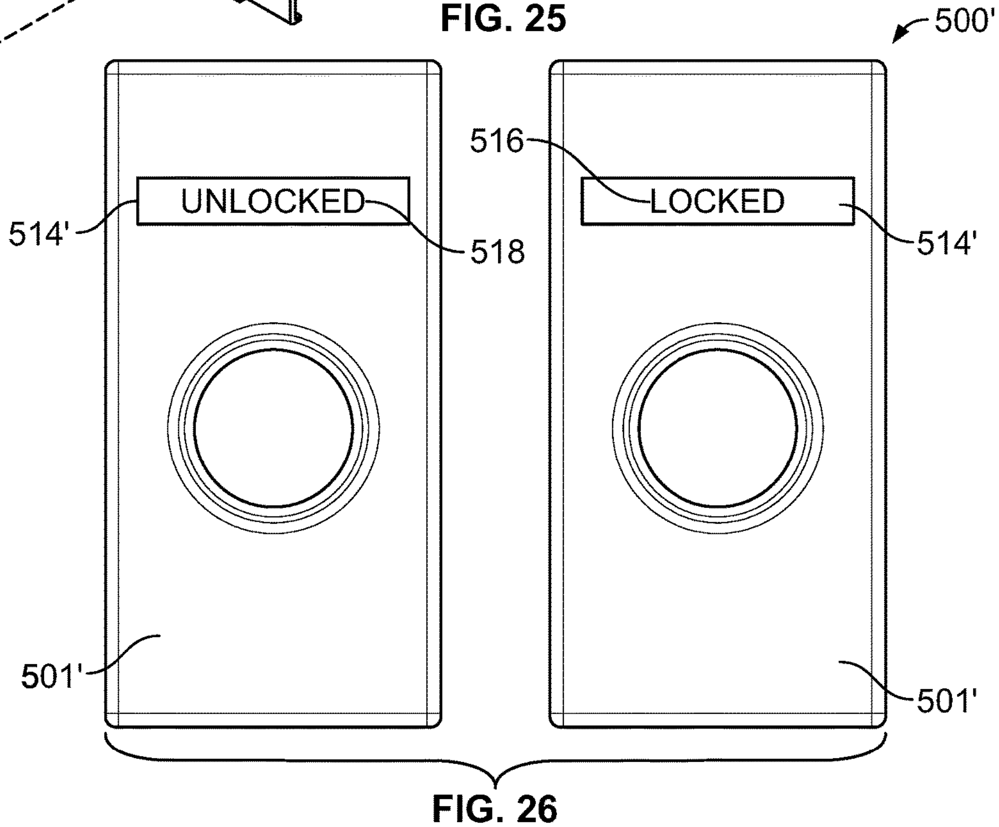
FIG. 26 illustrate a front side view of a portion of the indicator mechanism assembly shown in FIG. 25 in both an unlocked indicator position and a locked indicator position.
Figure 27:
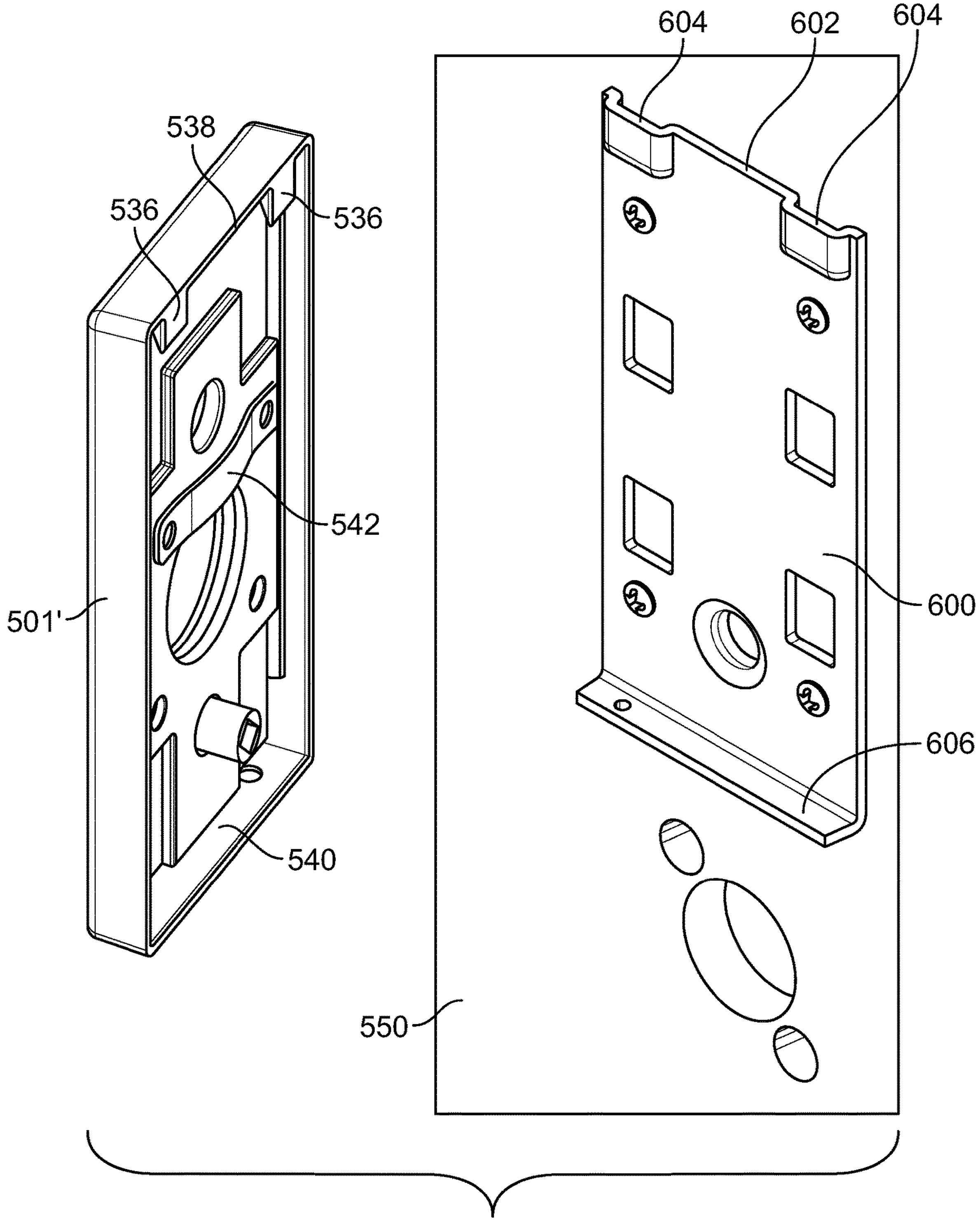
FIG. 27 illustrates a rear side perspective view of the indicator mechanism assembly shown in FIG. 25 being positioned for attachment to an exemplary plate punch that is attached to an entryway device.

FIG. 27 illustrates a rear side perspective view of the indicator mechanism assembly 500' shown in FIG. 25 being positioned for attachment to a plate punch 600 that is attached to an entryway device 550. As shown, the plate punch 600 can include a plurality of apertures that are sized to receive a mechanical fastener, such as, for example, a screw, that secures the plate punch 600 to the entryway device 550. As shown, an upper edge 602 of the plate punch 600 can include a plurality of pockets 604 that can each matingly receive a retention tab 536 that extends downwardly from an upper outer wall 538 of the outer cover 501'. Additionally, the plate punch can include a lower ledge 606 that is positioned to abut an inner lower wall 540 of the outer cover 501'. According to certain embodiments, the punch plate 600 can have a length between the lower ledge 606 and the upper portion of the punch plate 600 that is adjacent to the pockets 604 that can result in a compressive engagement between the outer cover 501' and the punch plate 600 when assembled. Further, the indicator mechanism assembly 500' can include a spring 542 that is attached to the rear case 508', and which can abut the plate punch 600.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A lock apparatus including a lock assembly having a locked/unlocked state, the lock apparatus comprising:

a handle comprising a shank and a grip portion, wherein the grip portion extends from the shank in a first direction, and wherein the grip portion comprises a display area extending at least primarily in the first direction;

a latch bolt, wherein the handle is operable to retract the latch bolt when the locked/unlocked state is an unlocked state, and wherein the handle is inoperable to retract the latch bolt when the locked/unlocked state is a locked state; and a status indicator movably mounted in the grip portion of the handle and configured to selectively display one or more indicia within the display area to thereby indicate the locked/unlocked state of the lock assembly; and wherein the grip portion of the handle has a length in the first direction, and wherein the status indicator extends in the first direction over at least a majority of the length of the grip portion.

2. The lock apparatus of claim 1, wherein the status indicator is operable to display a locked indicium to thereby indicate that the locked/unlocked state is the locked state.

3. The lock apparatus of claim 2, wherein the status indicator is operable to display an unlocked indicium to thereby indicate that the locked/unlocked state is the unlocked state.

4. The lock apparatus of claim 1, wherein the status indicator is operable to display an unlocked indicium to thereby indicate that the locked/unlocked state is the unlocked state.

5. The lock apparatus of claim 1, wherein the display area includes an opening that extends in the first direction over the at least a majority of the length of the grip portion; and wherein the one or more indicia are visible through the opening to indicate the locked/unlocked state of the lock assembly.

6. The lock apparatus of claim 1, wherein the status indicator displays a first indicium in the display area that indicates the lock assembly is in a locked state of the lock assembly, and wherein the status indicator displays a second indicium in the display area that indicates the lock assembly is in an unlocked state of the lock assembly.

7. The lock apparatus of claim 1, wherein transitioning the lock assembly between the locked state and the unlocked state moves the status indicator between a first position indicating the locked state of the lock assembly and a second position indicating the unlocked state of the lock assembly.

8. The lock apparatus of claim 1, wherein the status indicator is rotatably mounted in the grip portion of the handle.

9. The lock apparatus of claim 1, wherein the status indicator is rotatable between a lock-indicating position corresponding to the locked state of the lock assembly and an unlock-indicating position corresponding to the unlocked state of the lock assembly.

10. A lock apparatus including a lock assembly having a locked/unlocked state, the lock apparatus comprising:

a handle comprising a shank and a grip portion, wherein the grip portion extends from the shank in a first direction, and wherein the grip portion comprises a display area extending at least primarily in the first direction;

a latch bolt, wherein the handle is operable to retract the latch bolt when the locked/unlocked state is an unlocked state, and wherein the handle is inoperable to retract the latch bolt when the locked/unlocked state is a locked state; and a status indicator mounted in the grip portion, the status indicator comprising a rotatable barrel configured to selectively display one or more indicia within the display area to thereby indicate the locked/unlocked state of the lock assembly.

11. The lock apparatus of claim 10, wherein the barrel comprises the one or more indicia.

12. A method of operating a lock apparatus comprising a lock assembly, a handle including a shank and a grip portion extending from the shank in a lateral direction, the handle operable to retract a latch bolt when the lock assembly is in an unlocked state and inoperable to retract the latch bolt when the lock assembly is in a locked state, the method comprising:

selectively displaying one or more indicia of a status indicator by moving the status indicator in the grip portion of the handle to selectively indicate the locked and unlocked states of the lock assembly in a display area of the grip portion; and wherein the display area is located on a front face of the grip portion, wherein the grip portion of the handle has a length in the lateral direction, and wherein the status indicator extends in the lateral direction at least a majority of the length of the grip portion.

13. The method of claim 12, wherein selectively displaying the one or more indicia comprises displaying a locked indicium in response to the lock assembly being in the locked state.

14. The method of claim 12, wherein selectively displaying the one or more indicia comprises displaying an unlocked indicium in response to the lock assembly being in the unlocked state.

15. The method of claim 12, wherein transitioning the lock assembly between the locked state and the unlocked state moves the status indicator between a first position indicating the locked state of the lock assembly and a second position indicating the unlocked state of the lock assembly.

16. The method of claim 12, wherein selectively displaying the one or more indicia of the status indicator comprises rotating the status indicator in the grip portion of the handle to selectively indicate the locked and unlocked states of the lock assembly.

17. A method of operating a lock apparatus comprising a lock assembly, a handle including a shank and a grip portion extending from the shank in a lateral direction, the handle operable to retract a latch bolt when the lock assembly is in an unlocked state and inoperable to retract the latch bolt when the lock assembly is in a locked state, the method comprising:

selectively displaying one or more indicia of a status indicator by rotating a barrel mounted in the grip portion of the handle to indicate the locked and unlocked states of the lock assembly in a display area of the grip portion, the barrel comprising the one or more indicia; and wherein the display area is located on a front face of the grip portion, wherein the grip portion of the handle has a length in the lateral direction, and wherein the status indicator extends in the lateral direction at least a majority of the length of the grip portion.

* * * * *